(12) United States Patent
Nakajima et al.

(10) Patent No.: US 10,109,827 B2
(45) Date of Patent: Oct. 23, 2018

(54) SEALANT FILM FOR PACKAGING MATERIAL OF POWER STORAGE DEVICE, PACKAGING MATERIAL FOR POWER STORAGE DEVICE, AND POWER STORAGE DEVICE

(71) Applicant: SHOWA DENKO PACKAGING CO., LTD, Kanagawa (JP)

(72) Inventors: Daisuke Nakajima, Kanagawa (JP); Makoto Karatsu, Kanagawa (JP); Takashi Nagaoka, Kanagawa (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 177 days.

(21) Appl. No.: 15/278,522

(22) Filed: Sep. 28, 2016

(65) Prior Publication Data

US 2017/0092903 A1    Mar. 30, 2017

(30) Foreign Application Priority Data

Sep. 29, 2015  (JP) ................. 2015-191135
Oct. 14, 2015  (JP) ................. 2015-202967

(51) Int. Cl.
*H01M 2/02*  (2006.01)
*H01M 2/08*  (2006.01)
*H01M 10/0525*  (2010.01)

(52) U.S. Cl.
CPC ....... *H01M 2/0287* (2013.01); *H01M 2/0277* (2013.01); *H01M 2/0285* (2013.01);
(Continued)

(58) Field of Classification Search
CPC ............. H01M 2/0287; H01M 2/0295; H01M 2/0277; H01M 2/08; H01M 2/0285; H01M 10/0525
See application file for complete search history.

(56) References Cited

U.S. PATENT DOCUMENTS

2015/0372263 A1*  12/2015  Douke ................ H01M 2/0275
                                                            429/176

FOREIGN PATENT DOCUMENTS

JP    2012-156404 A    8/2012
JP    2012-156489 A    8/2012

OTHER PUBLICATIONS

English Abstract of JP 2012-156404 A published Aug. 16, 2012 (1 page).

(Continued)

*Primary Examiner* — Stewart A Fraser
(74) *Attorney, Agent, or Firm* — Millen White Zelano and Branigan, PC; Csaba Henter

(57) ABSTRACT

A sealant film has a structure made of a laminated body of two or more layers. The laminated body includes a first resin layer 7 containing 50 mass % or more of a random copolymer containing propylene and a copolymer component other than propylene as copolymer components, and a second resin layer 8 formed by a mixed resin containing a first elastomer-modified olefin based resin having a crystallization temperature of 105° C. or higher and a crystallization energy of 50 J/g or more, and a second elastomer-modified olefin based resin having a crystallization temperature is 85° C. or higher and a crystallization energy of 30 J/g or less. With this structure, when the inner pressure of a power storage device is excessively increased, breakage (separation) occurs inside the sealant layer, causing gas-releasing, which in turn can prevent bursting of the packaging material due to the inner pressure increase.

18 Claims, 2 Drawing Sheets

(52) U.S. Cl.
CPC ........... *H01M 2/0295* (2013.01); *H01M 2/08* (2013.01); *H01M 10/0525* (2013.01)

(56) References Cited

OTHER PUBLICATIONS

English Abstract of JP 2012-156489 A published Aug. 16, 2012 (2 pages).

* cited by examiner

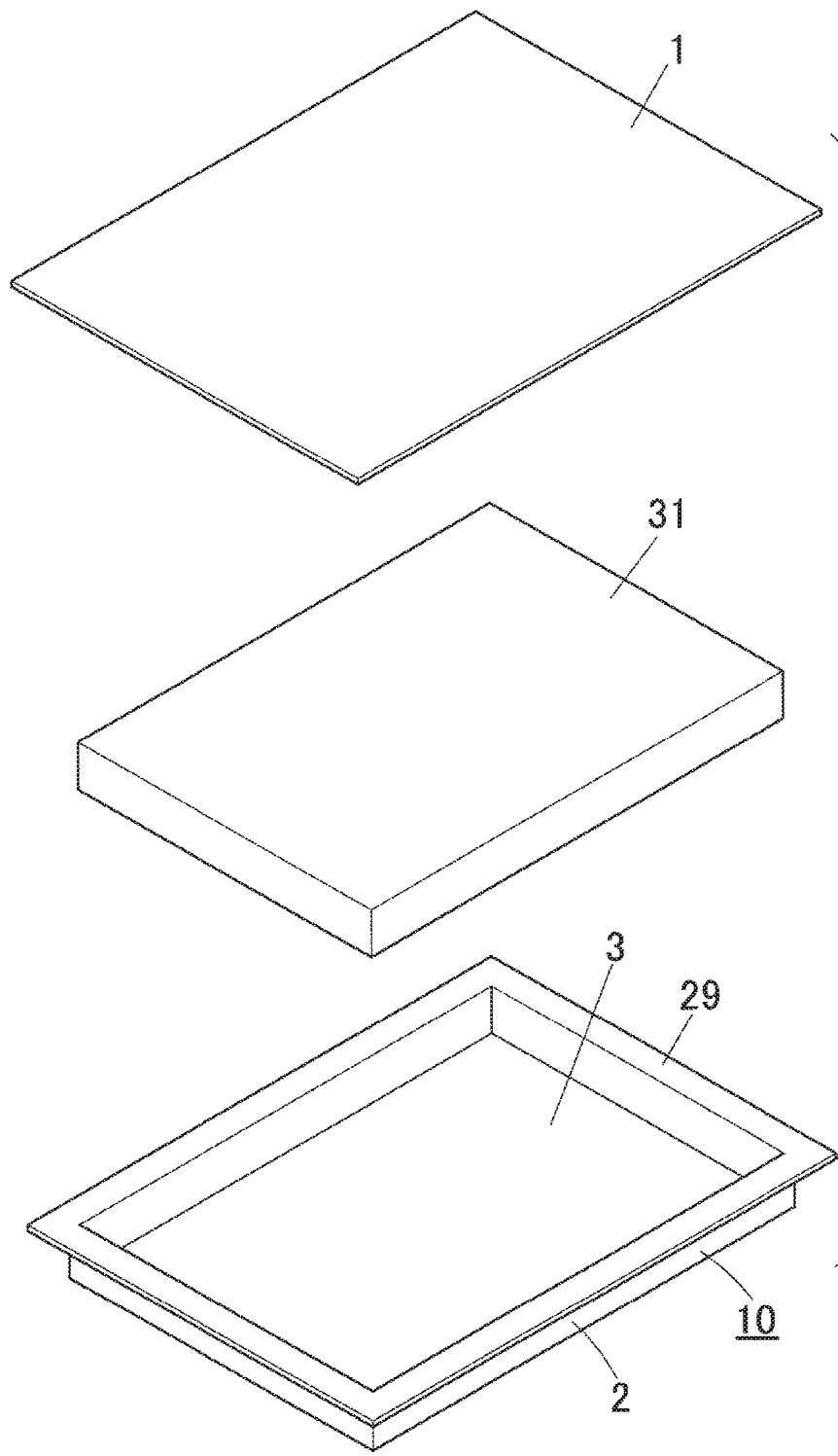

SEALANT FILM FOR PACKAGING MATERIAL OF POWER STORAGE DEVICE, PACKAGING MATERIAL FOR POWER STORAGE DEVICE, AND POWER STORAGE DEVICE

CROSS-REFERENCE TO THE RELATED APPLICATIONS

The present application claims priority to Japanese Patent Application No. 2015-191135 filed on Sep. 29, 2015 and Japanese Patent Application No. 2015-202967 filed on Oct. 14, 2015, the entire disclosure of each of which is incorporated herein by reference in its entirety.

BACKGROUND OF THE INVENTION

Technical Field

The present invention relates to a sealant film used to constitute a packaging material for a power storage device, a packaging material for a power storage device using the sealant film, and a power storage device constituted by using the packaging material.

In this specification and claims, the term "crystallization temperature" denotes a crystallization peak temperature measured by a differential scanning calorimetry (DSC) in accordance with JIS K7121-1987, and the term "crystallization energy" denotes a crystallization heat (crystallization energy) measured by a differential scanning calorimetry (DSC) in accordance with JIS K7122-1987.

Further, in this specification and claims, it is intended that the term "crystallization temperature" refers to the highest value among crystallization temperatures when there exist two or more crystallization peaks and there exist two (Tcp1, Tcp2) or more crystallization temperatures.

Further, in this specification and claims, it is intended that the term "crystallization energy" refers to a value of the highest crystallization energy when there exists two or more crystallization peaks and there also exist two ($\Delta$Hc1, $\Delta$Hc2) or more crystallization energy.

Further, in this specification and claims, the term "aluminum" is used to include the meaning of aluminum and its alloys.

Further, in this specification and claims, the term "polymer component" does not include neither of "first elastomer-modified olefin based resin" and "second elastomer-modified olefin based resin".

Further, in this specification and claims, although "olefin based elastomer" and "styrene based elastomer" are defined, the elastomer containing both olefin and styrene is defined to be classified (categorized) into (defined to belong to) the "styrene based elastomer".

Description of the Related Art

The following description of related art sets forth the inventors' knowledge of related art and certain problems therein and should not be construed as an admission of knowledge in the prior art.

A lithium-ion secondary battery is widely used as an electric power source for, e.g., a notebook computer, a video camera, a mobile phone, and an electric-powered vehicle. As the lithium-ion secondary battery, a battery structured such that a periphery of a battery body part (main body part including the positive electrode, the negative electrode, and the electrolyte) is surrounded by a case is used. As the material for the case (packaging material), for example, a material structured such that an outer layer made of a heat-resistant resin film, an aluminum foil layer, and an inner layer made of a thermoplastic resin film are integrally bonded in this order is well-known.

A power storage device is structured such that a power storage device body is sandwiched by a pair of packaging materials and the peripheral edge parts of the pair of packaging materials are fusion bonded (heat sealed) to be sealed.

In the meantime, in a lithium-ion secondary battery, etc., the battery body part tends to generate a gas when excessively charged or excessively raised in temperature. For this reason, in some cases, the gas is gradually accumulated in an inner space covered by the packaging material, causing an increased inner pressure of the inside of the packaging material. Since there is a concern that the increase in inner pressure causes bursting of the packaging material, a technology of preventing such bursting of the packaging material has been proposed.

For example, Patent Document 1 (Japanese Unexamined application publication No. 2012-156404) discloses a power storage device equipped with an explosion-proof function. The power storage device includes an electrode laminated body in which sheet-shaped positive electrodes and negative electrodes are laminated via separators. The electrode laminated body is accommodated in a metal laminated film container together with electrolyte. The container is liquid-tightly sealed by a heat sealed portion formed by heat sealing the metal laminated film in a strip-shaped manner along the outer peripheral edge of the container. The power storage device is equipped with a perforating device including a blade support fixedly secured with the outer peripheral edge part of the container pinched and a blade member supported by the blade support and arranged at a center side position than the heat sealed portion of the container. The blade support is configured to move in the outer peripheral direction of the container by being pushed out by the container expanded and deformed at the time of gas generation, so that the blade member is moved together with the blade support to cut though the container.

Further, Patent Document 2 (Japanese Unexamined Application Publication No. 2012-156489) discloses an electric storage element. This electric storage element is provided with an electric storage element body in which electrolyte is impregnated, a packaging member sealing the electric storage element body, a first gas release mechanism arranged inside the packaging member, and a second gas release mechanism arranged outside the packaging member. It is configured such that gas from the inner space of the packaging member accommodating the electric storage element body sequentially passes through each of the gas release mechanisms to thereby allow the gas release from the inner space to the outer space. Further, the electric storage element is provided with a pressure adjustment device that prevents the intrusion of gas from the outer space to the inner space by each of the gas release mechanisms. Between the gas release mechanisms, a buffer space individually partitioned by each of the gas release mechanisms is formed.

However, as described in Patent Document 1, in the case of providing the perforating device including the blade support and the blade member, there are problems such that a new step for providing the perforating device will be required, the production step becomes complicated, and the productivity deteriorates. Further, it is required to provide a structural part, i.e., the perforating device, the cost increases correspondingly.

Further, as described in Patent Document 2, in the case of providing a safety valve mechanism (gas release mechanism, etc.) for releasing the gas generated in the packaging member to the outside of the packaging member, there are problems such that a new step for providing the safety valve mechanism is required, and the productivity deteriorates. Further, it is required to provide a new structural part, i.e., a safety valve mechanism, the cost increases correspondingly.

The description herein of advantages and disadvantages of various features, embodiments, methods, and apparatus disclosed in other publications is in no way intended to limit the present disclosure. For example, certain features of the preferred described embodiments of the disclosure may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

Some embodiments in this disclosure have been developed in view of the above-mentioned and/or other problems in the related art. The embodiments in this disclosure can significantly improve upon existing methods and/or apparatuses.

The present invention was made in view of the aforementioned technical background, and aims to provide a sealant film for a packaging material of a power storage device, a packaging material for a power storage device, and a power storage device, which is excellent in productivity and capable of reducing a production cost and securing an adequate seal strength, and when an inner pressure of the power storage device increases excessively, breakage (separation) occurs inside the sealant layer to perform gas releasing to thereby prevent bursting of the packaging material due to an inner pressure increase, even when the broken point for bursting prevention is generated, continuous breaking which occurs from the broken point as a starting point hardly progresses, and whitening can be suppressed at the time of forming.

The other purposes and advantages of some embodiments of the present disclosure will be made apparent from the following preferred embodiments.

To attain the aforementioned objects, the present invention provides the following means.

[1] A sealant film for a packaging material of a power storage device, including:
a laminated body of two or more layers,
wherein the laminated body includes
a first resin layer containing 50 mass % or more of a random copolymer containing propylene and another copolymer component other than propylene as copolymer components, and
a second resin layer formed by a mixed resin containing a first elastomer-modified olefin based resin having a crystallization temperature of 105° C. or higher and a crystallization energy of 50 J/g or more, and a second elastomer-modified olefin based resin having a crystallization temperature of 85° C. or higher and a crystallization energy of 30 J/g or less,
wherein the first elastomer-modified olefin based resin is made of elastomer-modified homopolypropylene and/or elastomer-modified random copolymer,
wherein the second elastomer-modified olefin based resin is made of elastomer-modified homopolypropylene and/or elastomer-modified random copolymer,
wherein the elastomer-modified random copolymer is an elastomer-modified product of a random copolymer containing propylene and another copolymer component other than propylene as copolymer components, and
wherein in the second resin layer, a total value of a content rate of the first elastomer-modified olefin based resin and a content rate of the second elastomer-modified olefin based resin is 50 mass % or more.

[2] The sealant film for a packaging material of a power storage device as recited in the aforementioned Item [1],
wherein in the second resin layer, the content rate of the second elastomer-modified olefin based resin is 1 mass % to 50 mass %.

[3] The sealant film for a packaging material of a power storage device as recited in the aforementioned Item [1] or [2],
wherein the elastomer is an ethylene-propylene rubber.

[4] The sealant film for a packaging material of a power storage device as recited in any one of the aforementioned Items [1] to [3],
wherein the first resin layer contains an anti-blocking agent and a slip agent together with the random copolymer, and
wherein the second resin layer contains a slip agent together with the first elastomer-modified olefin based resin and the second elastomer-modified olefin based resin.

[5] The sealant film for a packaging material of a power storage device as recited in any one of the aforementioned Items [1] to [4],
wherein the second elastomer-modified olefin based resin has two or more crystallization peaks in a DSC measurement graph.

[6] The sealant film for a packaging material of a power storage device as recited in any one of the aforementioned Items [1] to [5],
wherein the sealant film includes only the first resin layer and the second resin layer laminated on one surface of the first resin layer.

[7] The sealant film for a packaging material of a power storage device as recited in any one of the aforementioned Items [1] to [5],
wherein the sealant film is a laminated body in which at least three layers are laminated, the at least three layers including the second resin layer, the first resin layer laminated on one of surfaces of the second resin layer, and a first resin layer laminated on the other of surfaces of the second resin layer.

[8] A packaging material for a power storage device, including:
a base material layer as an outer layer;
an inner sealant layer made of the sealant film as recited in any one of the aforementioned Items [1] to [7]; and
a metal foil layer arranged between the base material layer and the inner sealant layer,
wherein in the inner sealant layer, the first resin layer is arranged on an innermost layer side.

[9] A packaging case for a power storage device,
wherein the packaging case is made of a formed product of the packaging material as recited in the aforementioned Item [8].

[10] A method for producing a packaging case for a power storage device, the method including deep drawing or stretch forming of the packaging material for a power storage device as recited in the aforementioned Item [8].

[11] A power storage device includes
a power storage device main body, and
a packaging member made of the packaging material for a power storage device as recited in the aforementioned Item [8] and/or the packaging case for a power storage device as recited in the aforementioned Item [9],
wherein the power storage device main body is packaged with the packaging member.

[12] A sealant film for a packaging material of a power storage device, including:
a laminated body of two or more layers including
a first resin layer containing 50 mass % or more of a random copolymer containing propylene and another copolymer component other than propylene as copolymer components,
a second resin layer formed by a composition containing a first elastomer-modified olefin based resin having a crystallization temperature of 105° C. or higher and a crystallization energy of 50 J/g or more, and a polymer component,
wherein the first elastomer-modified olefin based resin is made of elastomer-modified homopolypropylene and/or elastomer-modified random copolymer,
wherein the elastomer-modified random copolymer is an elastomer-modified product of a random copolymer containing propylene and another copolymer component other than propylene as copolymer components,
wherein in the second resin layer, a content rate of the first elastomer-modified olefin based resin is 50 mass % or more, and
wherein the polymer component is at least one kind of polymer components selected from the group consisting of a random copolymer containing propylene and another copolymer component other than propylene as copolymer components, homopolypropylene, olefin based elastomer and styrene based elastomer.

[13] A sealant film for a packaging material of a power storage device, including:
a laminated body of two or more layers,
wherein the laminated body includes
a first resin layer containing 50 mass % or more of a random copolymer containing propylene and another copolymer component other than propylene as copolymer components,
a second resin layer formed by a composition containing a first elastomer-modified olefin based resin having a crystallization temperature of 105° C. or higher and a crystallization energy of 50 J/g or more, a second elastomer-modified olefin based resin having a crystallization temperature of 85° C. or higher and a crystallization energy of 30 J/g or less, and a polymer component,
wherein the first elastomer-modified olefin based resin is made of elastomer-modified homopolypropylene and/or elastomer-modified random copolymer,
wherein the second elastomer-modified olefin based resin is made of elastomer-modified homopolypropylene and/or elastomer-modified random copolymer,
wherein the elastomer-modified random copolymer is an elastomer-modified product of a random copolymer containing propylene and another copolymer component other than propylene as copolymer components,
wherein in the second resin layer, a total value of a content rate of the first elastomer-modified olefin based resin and a content rate of the second elastomer-modified olefin based resin is 50 mass % or more, and
wherein the polymer component is at least one kind of polymer components selected from the group consisting of a random copolymer containing propylene and another copolymer component other than propylene as a copolymer component, homopolypropylene, olefin based elastomer and styrene based elastomer.

[14] The sealant film for a packaging material of a power storage device as recited in the aforementioned Item [13],
wherein in the second resin layer, a content rate of the second elastomer-modified olefin based resin is 1 mass % to 50 mass %.

[15] The sealant film for a packaging material of a power storage device as recited in the aforementioned Item [13] or [14],
wherein the second elastomer-modified olefin based resin has two or more crystallization peaks in a DSC measurement graph.

[16] The sealant film for a packaging material of a power storage device as recited in any one of the aforementioned Items [12] to [15],
wherein in the second resin layer, a content rate of the polymer component is 1 mass % or more and less than 50 mass %.

[17] The sealant film for a packaging material of a power storage device as recited in any one of the aforementioned Items [12] to [16],
wherein an elastomer in the elastomer-modified homopolypropylene is an ethylene-propylene rubber, and
wherein an elastomer in the elastomer-modified random copolymer is an ethylene-propylene rubber.

[18] The sealant film for a packaging material of a power storage device as recited in any one of the aforementioned Items [12] to [17],
wherein the first resin layer further contains an anti-blocking agent and a slip agent, and
wherein the second resin layer further contains a slip agent.

[19] The sealant film for a packaging material of a power storage device as recited in any one of the aforementioned Items [12] to [18],
wherein the sealant film includes only the first resin layer and the second resin layer laminated on one of surfaces of the first resin layer.

[20] The sealant film for a packaging material of a power storage device as recited in any one of the aforementioned Items [12] to [18],
wherein the sealant film is a laminated body in which at least three layers are laminated, the at least three layers including the second resin layer, the first resin layer laminated on one of surfaces of the second resin layer, and a first resin layer laminated on the other of surfaces of the second resin layer.

[21] A packaging material for a power storage device, comprising:
a base material layer as an outer layer;
an inner sealant layer made of the sealant film as recited in any one of the aforementioned Items [12] to [20]; and
a metal foil layer arranged between the base material layer and the inner sealant layer,
wherein in the inner sealant layer, the first resin layer is arranged on an innermost layer side.

[22] A packaging case for a power storage device,
wherein the packaging case is made of a formed product of the packaging material for a power storage device as recited in the aforementioned Item [21].

[23] A method for producing a packaging case for a power storage device, the method including deep drawing or stretch forming of the packaging material for a power storage device as recited in the aforementioned Item [21].

[24] A power storage device including
a power storage device main body, and
a packaging member made of the packaging material for a power storage device as recited in the aforementioned Item [21] and/or the packaging case for a power storage device as recited in the aforementioned Item [22],
wherein the power storage device main body is packaged with the packaging member.

[25] A method for producing a sealant film resin composition for a packaging material of a power storage device, the method including
a preliminary melt-kneading step of obtaining a first melt-kneaded product by melt-kneading one, two or more kinds of elastomer components and one, two or more kinds of plastomer components, and
a step of obtaining a resin composition by mixing a first melt-kneaded product, a first elastomer-modified olefin based resin having a crystallization temperature of 105° C. or higher and a crystallization energy of 50 J/g or more, and a second elastomer-modified olefin based resin having a crystallization temperature of 85° C. or higher and a crystallization energy of 30 J/g or less.

[26] The method for producing a sealant film resin composition for a packaging material of a power storage device as recited in the aforementioned Item [25],
wherein the elastomer component used in the preliminary melt-kneading step is one, two or more kinds of elastomer components selected from the group consisting of an olefin based elastomer, a styrene based elastomer, and a second elastomer-modified olefin based resin having a crystallization temperature of 85° C. or higher and a crystallization energy of 30 J/g or less.

[27] The method for producing a sealant film resin composition for a packaging material of a power storage device as recited in the aforementioned Item [25] or [26],
wherein the plastomer component used in the preliminary melt-kneading step is one, two or more kinds of plastomer components selected from the group consisting of a random polypropylene, homopolypropylene, and a first elastomer-modified olefin based resin having a crystallization temperature of 105° C. or higher and a crystallization energy of 50 J/g or more.

[28] The method for producing a sealant film resin composition for a packaging material of a power storage device as recited in the aforementioned Item [25],
wherein the elastomer component used in the preliminary melt-kneading step is a second elastomer-modified olefin based resin having a crystallization temperature of 85° C. or higher and a crystallization energy of 30 J/g or less, and
wherein the plastomer component used in the preliminary melt-kneading step contains a first elastomer-modified olefin based resin having a crystallization temperature of 105° C. or higher and a crystallization energy of 50 J/g or more, and further contains random polypropylene and/or hommopolypropylene.

[29] A method for producing a sealant film resin composition for a packaging material of a power storage device, the method including
a preliminary melt-kneading step of obtaining a first melt-kneaded product by melt-kneading one, two or more kinds of elastomer components and one, two or more kinds of plastomer components, and
a step of obtaining a resin composition by mixing the first melt-kneaded product, and a first elastomer-modified olefin based resin having a crystallization temperature of 105° C. or higher and a crystallization energy of 50 J/g or more.

[30] The method for producing a sealant film resin composition for a packaging material of a power storage device as recited in the aforementioned Item [29],
wherein the elastomer component used in the preliminary melt-kneading step is one, two or more kinds of elastomer components selected from the group consisting of an olefin based elastomer, a styrene based elastomer, and a second elastomer-modified olefin based resin having a crystallization temperature of 85° C. or higher and a crystallization energy of 30 J/g or less.

[31] The method for producing a sealant film resin composition for a packaging material of a power storage device as recited in the aforementioned Item [29] or [30],
wherein the plastomer component used in the preliminary melt-kneading step is one, two or more kinds of plastomer components selected from the group consisting of random polypropylene, homopolypropylene, and a first elastomer-modified olefin based resin having a crystallization temperature of 105° C. or higher and a crystallization energy of 50 J/g or more.

[32] A method for producing a sealant film resin composition for a packaging material of a power storage device as recited in any one of the aforementioned Items [25] to [31], wherein in the preliminary melt-kneading step, a mixing mass ratio of elastomer component/plastomer component is set within a range of 5/95 to 70/30.

In the invention as recited in the aforementioned Item [1], it is equipped with a first resin layer containing 50 mass % or more of a random copolymer containing "propylene" and "another copolymer component other than propylene" as copolymer components. Therefore, by arranging the first resin layer on the innermost layer side of the inner sealant layer of the packaging material, sealing can be performed adequately even at a relatively low temperature (adequate seal strength can be secured). Further, the second resin layer has a component obtained by combining a first elastomer-modified olefin based resin having a crystallization temperature of 105° C. or higher and a crystallization energy of 50 J/g or more and a second elastomer-modified olefin based resin having a crystallization temperature of 85° C. or higher and a crystallization energy of 30 J/g or less. Therefore, the compatibility of elastomer component and olefin based resin is good, and the dispersiblity of elastomer component becomes good. With this, in the case where the seal portion is broken due to the excessive increase of the inner pressure of the pair of packaging materials in which the mutual inner sealant layers are heat-sealed joined, cohesive failure occurs in the second resin layer (inside of the sealant layer), which hardly causes breakage (separation) at the interface of the metal foil layer and the inner sealant layer. When a breakage (separation) for bursting prevention occurs, there is a merit that a breakage continuing from the broken point as a starting point hardly progresses.

Further, since compatibility of an interface of an elastomer phase and an olefin based resin phase is good, voids (cavities generated at an inside of the shaped product) unlikely occurs, and whitening can be suppressed at the time of shaping. Further, since the crystallization temperature of the first elastomer-modified olefin based resin is 105° C. or higher, the second resin layer hardly crushes at the time of the heat sealing, which in turn can secure insulation properties adequately.

Further, since it is not required to provide a new structural part (a perforating device or a gas release mechanism employed in a conventional technology) separately to release gases outside, the production cost can be reduced correspondingly, it becomes possible to attain further compactness, and the productivity is good.

In the invention as recited in the aforementioned Item [2], the aforementioned various effects can be secured sufficiently. Especially, at the time of the heat sealing, the second resin layer is more unlikely crushed, and more sufficient insulation properties can be secured.

In the invention as recited in the aforementioned Item [3], the aforementioned various effects can be secured more assuredly.

In the invention as recited in the aforementioned Item [4], excellent slipping properties can be given to the surface of the packaging material, which enables excellent shaping deeper in depth at the time of shaping the packaging material and also enables adequate suppressing of whitening at the time of shaping the packaging material.

In the invention as recited in the aforementioned Item [5], the aforementioned various effects can be secured more adequately.

In the invention as recited in the aforementioned Items [6] and [7], the aforementioned various effects can be secured more assuredly.

In the invention as recited in the aforementioned Item [8], the productivity is good, the cost can be suppressed, adequate seal strength can be secured, and when the inner pressure of the power storage device is increased excessively, cohesive failure occurs at the second resin layer (inside of the sealant layer). Therefore, it is possible to provide a packaging material for a power storage device that can prevent bursting of the packaging material due to the increase of the inner pressure by performing gas-releasing, breakage continuing from the broken point as a starting point unlikely progresses when the broken point for bursting prevention is generated, and whitening can also be suppressed at the time of shaping.

In the invention as recited in the aforementioned Item [9], the productivity is good, the cost can be suppressed, adequate seal strength can be secured, and when the inner pressure of the power storage device is increased excessively, cohesive failure occurs at the second resin layer (inside of the sealant layer). Therefore, it is possible to provide a packaging material for a power storage device that can prevent bursting of the packaging material due to the increase of the inner pressure by performing gas-releasing, breakage continuing from the broken point as a starting point unlikely progresses when the broken point for bursting prevention is generated, and whitening can also be suppressed at the time of shaping.

In the invention as recited in the aforementioned Item [10], it is possible to produce, with a good production efficiency, a packaging material for a power storage device that can suppress the cost and secure adequate seal strength, and also causes cohesive failure at the second resin layer (inside of the sealant layer) when the inner pressure of the power storage device is excessively increased to prevent bursting of the packaging material due to the increase of the inner pressure, breakage continuing from the broken point as a starting point unlikely progresses when the broken point for bursting prevention is generated, and whitening can also be suppressed at the time of shaping.

In the invention as recited in the aforementioned Item [11], it is possible to produce a packaging material for a power storage device that can secure adequate seal strength for the packaging material, and also causes cohesive failure at the second resin layer (inside of the sealant layer) when the inner pressure of the power storage device is excessively increased to prevent bursting of the packaging material due to the increase of the inner pressure, breakage continuing from the broken point as a starting point unlikely progresses when the broken point for bursting prevention is generated, and whitening can also be suppressed at the time of shaping.

In the invention as recited in the aforementioned Item [12], it is equipped with a first resin layer containing 50 mass % or more of a random copolymer containing "propylene" and "another copolymer component other than propylene" as copolymer components. Therefore, by arranging the first resin layer on the innermost layer side of the inner sealant layer of the packaging material, sealing can be performed adequately even at a relatively low temperature (adequate seal strength can be secured). Further, the second resin layer contains the first elastomer-modified olefin based resin having a crystallization temperature of 105° C. or higher and a crystallization energy of 50 J/g or more. Therefore, the compatibility of the elastomer phase and the olefin based phase is good, and the dispersiblity of the elastomer phase becomes good. With this, in cases where the seal portion is broken due to the excessive increase of the inner pressure of the pair of packaging materials in which the mutual inner sealant layers are heat-sealed joined, cohesive failure occurs in the second resin layer (inside of the sealant layer), which hardly causes breakage (separation) at the interface of the metal foil layer and the inner sealant layer. When a breakage (separation) for bursting prevention occurs, there is a merit that a breakage continuing from the broken point as a starting point unlikely progresses.

Further, since compatibility of an interface of an elastomer phase and an olefin based resin phase is good, voids (cavities generated at an inside of the shaped product) unlikely occurs, and whitening can be suppressed at the time of shaping. Further, since the crystallization temperature of the first elastomer-modified olefin based resin is 105° C. or higher, the second resin layer is hardly crushed at the time of the heat sealing, which in turn can secure adequate insulation properties.

Further, the second resin layer contains the specific polymer component together with the first elastomer-modified olefin based resin having a crystallization temperature of 105° C. or higher and a crystallization energy of 50 J/g or more. Therefore, when the seal portion is broken due to the excessive increase of the inner pressure, cohesive failure adequately occurs at the second resin layer (inside of the sealant layer). When a breakage (separation) for bursting prevention occurs, an effect that a breakage continuing from the broken point as a starting point unlikely progresses can be obtained, and whitening at the time of shaping can be suppressed more adequately.

Further, since it is not required to provide a new structural part (a perforating device or a gas release mechanism employed in a conventional technology) separately to release gases outside, the production cost can be reduced correspondingly, it becomes possible to attain further compactness, and the productivity is good.

In the invention as recited in the aforementioned Item [13], it is equipped with a first resin layer containing 50 mass % or more of a random copolymer containing "propylene" and "another copolymer component other than propylene" as copolymer components. Therefore, by arranging the first resin layer on the innermost layer side of the inner sealant layer of the packaging material, sealing can be performed adequately even at a relatively low temperature (adequate seal strength can be secured). Further, the second resin layer has a component obtained by combining a first elastomer-modified olefin based resin having a crystallization temperature of 105° C. or higher and a crystallization energy of 50

J/g or more and a second elastomer-modified olefin based resin having a crystallization temperature of 85° C. or higher and a crystallization energy of 30 J/g or less. The compatibility of the elastomer phase and the olefin based phase is good, and the dispersiblity of the elastomer phase becomes good. With this, in cases where the seal portion is broken due to the excessive increase of the inner pressure of the pair of packaging materials in which the mutual inner sealant layers are heat-sealed joined, cohesive failure occurs in the second resin layer (inside of the sealant layer), which hardly causes breakage (separation) at the interface of the metal foil layer and the inner sealant layer. Therefore, when a breakage (separation) for bursting prevention occurs, there is a merit that a breakage continuing from the broken point as a starting point unlikely progresses.

Further, since compatibility of an interface of an elastomer phase and an olefin based resin phase is good, voids (cavities generated at an inside of the shaped product) unlikely occurs, and whitening can be suppressed at the time of shaping. Further, since the crystallization temperature of the first elastomer-modified olefin based resin is 105° C. or higher, the second resin layer is hardly crushed at the time of the heat sealing, which in turn can secure adequate insulation properties.

Further, since the second resin layer further contains the aforementioned specific polymer component, when the seal portion is broken due to the excessive increase of the inner pressure, cohesive failure adequately occurs at the second resin layer (inside of the sealant layer). Therefore, when a breakage (separation) for bursting prevention occurs, an effect that a breakage continuing from the broken point as a starting point unlikely progresses can be obtained, and whitening at the time of shaping can be suppressed more adequately.

Further, since it is not required to provide a new structural part (a perforating device or a gas release mechanism employed in a conventional technology) separately to release gases outside, the cost can be reduced correspondingly, it becomes possible to attain further compactness, and the productivity is good.

In the invention as recited in the aforementioned Item [14], the aforementioned various effects can be secured sufficiently. Especially, at the time of the heat sealing, the second resin layer is more unlikely crushed, and more sufficient insulation properties can be secured.

In the invention as recited in the aforementioned Item [15], the aforementioned various effects can be secured adequately.

In the invention as recited in the aforementioned Item [16], the aforementioned various effects can be secured more assuredly.

In the invention as recited in the aforementioned Item [17], the aforementioned various effects can be secured more assuredly.

In the invention as recited in the aforementioned Item [18], excellent slipping properties can be given to the surface of the packaging material, which enables excellent shaping deeper in depth at the time of shaping the packaging material and also enables adequate suppressing of whitening at the time of shaping the packaging material.

In the invention as recited in the aforementioned Items [19] and [20], the aforementioned various effects can be secured more assuredly.

In the invention as recited in the aforementioned Item [21], it is possible to produce a packaging material for a power storage device that is excellent in productivity, can suppress the cost and secure adequate seal strength, and also causes cohesive failure at the second resin layer (inside of the sealant layer) when the inner pressure of the power storage device is excessively increased to prevent bursting of the packaging material due to the increase of the inner pressure, breakage continuing from the broken point as a starting point unlikely progresses when the broken point for bursting prevention is generated, and whitening can also be suppressed at the time of shaping.

In the invention as recited in the aforementioned Item [22], it is possible to produce a packaging material for a power storage device that is excellent in productivity, can suppress the cost and secure adequate seal strength, and also causes cohesive failure at the second resin layer (inside of the sealant layer) when the inner pressure of the power storage device is excessively increased to prevent bursting of the packaging material due to the increase of the inner pressure, breakage continuing from the broken point as a starting point unlikely progresses when the broken point for bursting prevention is generated, and whitening can also be suppressed at the time of shaping.

In the invention as recited in the aforementioned Item [23], it is possible to produce, with a good production efficiency, a packaging material for a power storage device that can suppress the cost and secure adequate seal strength, and also causes cohesive failure at the second resin layer (inside of the sealant layer) when the inner pressure of the power storage device is excessively increased to prevent bursting of the packaging material due to the increase of the inner pressure, breakage continuing from the broken point as a starting point unlikely progresses when the broken point for bursting prevention is generated, and whitening can also be suppressed at the time of shaping.

In the invention as recited in the aforementioned Item [24], it is possible to produce a packaging material for a power storage device that can secure adequate seal strength for the packaging material, and also causes cohesive failure at the second resin layer (inside of the sealant layer) when the inner pressure of the power storage device is excessively increased to prevent bursting of the packaging material due to the increase of the inner pressure, breakage continuing from the broken point as a starting point unlikely progresses when the broken point for bursting prevention is generated, and whitening can also be suppressed at the time of shaping.

In the present invention as recited in the aforementioned Item [25], in the preliminary melt-kneading step, the elastomer component and the plastomer component are melt-knead to obtain the first melt-kneaded product, and in the first melt-kneaded product, the elastomer component and the plastomer component are mixed mutually with a high degree of dispersibility. Therefore, by mixing the first melt-kneaded product, the specific first elastomer-modified olefin based resin (plastomer phase), and the specific second elastomer-modified olefin based resin (elastomer phase), the obtained resin composition is extremely excellent in compatibility of the interface of the elastomer phase and the plastomer phase (non-elastmer phase). Therefore, in the packaging material for a power storage device structured using the sealant film containing the second resin layer formed by the obtained resin composition, when the sealing portion is broken due to the excessive increase in the inner pressure of the pair of packaging material in which the mutual inner sealant layers are heat-sealed joined, cohesive failure adequately occurs at the second resin layer (inside of the sealant layer). And breakage (separation) at the interface of the metal foil layer and the inner sealant layer extremely hardly occurs. Therefore, when a breakage (separation) for bursting prevention occurs, an effect that a breakage continuing from the broken point as a starting point extremely unlikely progresses can be obtained, and whitening at the time of shaping can be suppressed more adequately.

In the invention as recited in the aforementioned Item [26], a resin composition more excellent in compatibility of the interface of the elastomer phase and the plastomer phase (non-elastomer phase) can be obtained.

In the invention as recited in the aforementioned Item [27], a resin composition further more excellent in compatibility of the interface of the elastomer phase and the plastomer phase (non-elastomer phase) can be obtained.

In the invention as recited in the aforementioned Item [28], a resin composition more excellent in compatibility of the interface of the elastomer phase and the plastomer phase (non-elastomer phase) can be obtained.

In the present invention as recited in the aforementioned Item [29], in the preliminary melt-kneading step, the elastomer component and the plastomer component are melt-kneaded to obtain the first melt-kneaded product, and in the first melt-kneaded product, the elastomer component and the plastomer component are mixed mutually with a high degree of dispersibility. Therefore, by mixing the first melt-kneaded product and the specific first elastomer-modified olefin based resin (plastomer phase), the obtained resin composition is extremely excellent in compatibility of the interface of the elastomer phase and the plastomer phase (non-elastomer phase). Therefore, in the packaging material for a power storage device structured using the sealant film containing the second resin layer formed by the obtained resin composition, when the seal portion is broken due to the excessive increase in the inner pressure of the pair of packaging materials in which the inner sealant layers are mutually heat-sealed joined, cohesive failure adequately occurs at the second resin layer (inside of the sealant layer). Therefore, breakage (separation) at the interface of the metal foil layer and the inner sealant layer extremely hardly occurs. For this reason, when a breakage (separation) for bursting prevention occurs, an effect that a breakage continuing from the broken point as a starting point extremely unlikely progresses can be obtained, and whitening at the time of shaping can be suppressed more adequately.

In the invention as recited in the aforementioned Item [30], a resin composition more excellent in compatibility of the interface of the elastomer phase and the plastomer phase (non-elastomer phase) can be obtained.

In the invention as recited in the aforementioned Item [31], a resin composition further more excellent in compatibility of the interface of the elastomer phase and the plastomer phase (non-elastomer phase) can be obtained.

In the invention as recited in the aforementioned Item [32], a resin composition more excellent in compatibility of the interface of the elastomer phase and the plastomer phase (non-elastomer phase) can be obtained.

BRIEF DESCRIPTION OF THE DRAWINGS

Some embodiments of the present disclosure are shown by way of example, and not limitation, in the accompanying figures.

FIG. 4 is a perspective view showing a packaging material (plane shape), a power storage device main body, and a packaging case (three-dimensionally shaped product) constituting the power storage device shown in FIG. 3 in a separated state before heat sealing.

EMBODIMENTS FOR CARRYING OUT THE INVENTION

In the following paragraphs, some embodiments in the present disclosure will be described by way of example and not limitation. It should be understood based on this disclosure that various other modifications can be made by those in the art based on these illustrated embodiments.

Figure 1:
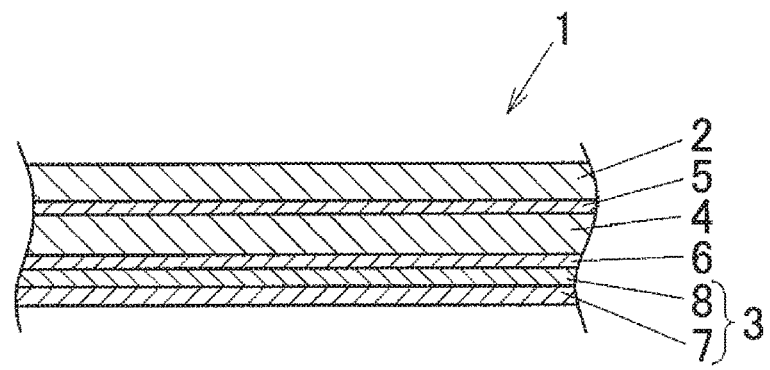
FIG. 1 is a cross-sectional view of a packaging material for a power storage device according to one embodiment of the present invention.

One embodiment of a packaging material 1 for a power storage device according the present invention is shown in FIG. 1. This packaging material 1 for a power storage device is used as, for example, a packaging material for a lithium-ion secondary battery. The packaging material 1 for a power storage device may be used as a packaging material as it is without being shaped, and also may be used as a packaging case 10 subjected to shaping, such as, e.g., deep drawing and stretch forming (see FIG. 4).

Figure 2:
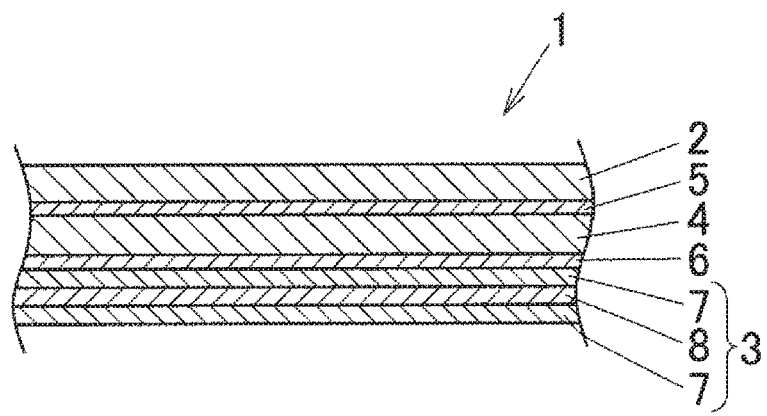
FIG. 2 is a cross-sectional view of a packaging material for a power storage device according to another embodiment of the present invention.

The packaging material 1 for a power storage device is structured such that a base material layer (outer layer) 2 is integrally laminated on one of surfaces of a metal foil layer 4 via a first adhesive agent layer 5 and an inner sealant layer (inner layer) 3 is integrally laminated on the other of surfaces of the metal foil layer 4 via a second adhesive agent layer 6 (see FIGS. 1 and 2).

In the packaging material 1 shown in FIG. 1, the inner sealant layer (inner layer) 3 is structured only by a first resin layer 7 and a second resin layer 8 laminated on one of surfaces of the first resin layer, and the first resin layer 7 is arranged on the innermost layer side.

In the packaging material 1 shown in FIG. 2, the inner sealant layer (inner layer) 3 is a three-layer laminate structure including a second resin layer 8, a first resin layer 7 laminated on one of surfaces of the second resin layer 8, and a first resin layer 7 laminated on the other of surfaces of the second resin layer 8, and one of the first resin layers 7 is arranged on the innermost layer side.

As the inner sealant layer (sealant film)(inner layer) 3, a sealant film according to the first invention and a sealant film according to the second invention, which will be described later, is used. The detail structure of the first resin layer and the second resin layer 8 will be described later.

In the present invention, the inner sealant layer (inner layer) 3 gives excellent chemical resistance also against highly corrosive electrolyte, etc., used in a lithium-ion secondary battery, etc., and plays a roll to give a heat sealing performance to a packaging material.

[Sealant Film for Packaging Material According to First Invention]

A sealant film for a packaging material according to the first invention will be described hereinafter. In the first invention, the inner sealant layer (sealant film)(inner layer) 3 is made of a two or more layered laminated body including a first resin layer 7 containing 50 mass % or more of a random copolymer containing "propylene" and "another copolymer component other than propylene" as copolymer components, and a second resin layer formed by a mixed resin including a first elastomer-modified olefin based resin having a crystallization temperature (Tcp) of 105° C. or higher and a crystallization energy (ΔHc) of 50 J/g or more, and a second elastomer-modified olefin based resin having a crystallization temperature (Tcp) of 85° C. or higher and a crystallization energy (ΔHc) of 30 J/g or less. It is preferable that the innermost layer of the inner sealant layer (inner layer) 3 be formed by the first resin layer 7.

The first elastomer-modified olefin based resin (first polypropylene block copolymer) is made of elastomer-modified homopolypropylene and/or elastomer-modified random copolymer. The elastomer-modified random copolymer is an elastomer-modified product of a random copolymer containing "propylene" and "another copolymer component other than propylene" as copolymer components. As the "another copolymer component other than propylene", although not specifically limited, it can be exemplified by, for example, olefin components, such as, e.g., ethylene, 1-butene, 1-hexene, 1-pentene, and 4-methyl-1-pentene, as well as butadiene, etc. As the elastomer, although not specifically limited, it is preferable to use EPR (ethylene-propylene rubber).

The second elastomer-modified olefin based resin (second polypropylene block copolymer) is made of elastomer-modified homopolypropylene and/or elastomer-modified random copolymer. The elastomer-modified random copolymer is an elastomer-modified product of a random copolymer containing "propylene" and "another copolymer component other than propylene" as copolymer components. As the "another copolymer component other than propylene", although not specifically limited, it can be exemplified by, for example, an olefin component, such as, e.g., ethylene, 1-butene, 1-hexene, 1-pentene, and 4-methyl-1-pentene, as well as butadiene. As the elastomer, although not specifically limited, it is preferable to use EPR (ethylene-propylene rubber).

The first resin layer 7 has a structure containing 50 mass % or more of a random copolymer containing "propylene" and "another copolymer component other than propylene" as copolymer components. As the "another copolymer component other than propylene", although not specifically limited, it can be exemplified by, for example, butadiene, as well as olefin components, such as, e.g., ethylene, 1-butene, 1-hexene, 1-pentene, and 4-methyl-1-pentene. When the content rate of the random copolymer is 50 mass % or more, an adequate heat seal strength can be secured. Among other things, it is preferable that the content rate of the random copolymer in the first resin layer 7 is set to 70 mass % or more. It is preferable that the random copolymer (random copolymer containing propylene and another copolymer component other than propylene as copolymer components) be a random copolymer having two or more melting points. In this case, it is possible to obtain effects that the heat seal performance can be further improved by the random copolymer component having a low melting point (the heat seal strength can be further increased) and the first resin layer 7 is unlikely crushed at the time of heat sealing by the random copolymer component having a high melting point, and therefore more adequate insulation properties can be secured.

The second resin layer 8 is formed by a mixed resin containing a first elastomer-modified olefin based resin having a crystallization temperature (Tcp) of 105° C. or higher and having a crystallization energy (ΔHc) of 50 J/g or more and a second elastomer-modified olefin based resin having a crystallization temperature (Tcp) of 85° C. or higher and a crystallization energy (ΔHc) of 30 J/g or less. When the crystallization temperature of the first elastomer-modified olefin based resin is less than 105° C., whitening occurs markedly at the time of shaping, and the second resin layer 8 tends to be crushed at the time of heat sealing, which tends to become insufficient in insulation property (see Comparative Example 4).

Further, when the crystallization temperature of the second elastomer-modified olefin based resin is less than 85° C., whitening occurs markedly at the time of shaping (see Comparative Example 5). Further, when the crystallization energy (ΔHc) of the first elastomer-modified olefin based resin is less than 50 J/g, the cohesion degree of the separation interface is medium, and therefore cohesive failure of the separation interface hardly occurs. In other words, separation tends to occur at the interface of the metal foil layer and the inner sealant layer at the time of separation, separation continuing from the separation point of the interface as a starting point readily progresses, and further the second layer 8 is readily crushed and therefore the insulation properties tend to become insufficient (see Comparative Example 6).

Further, when the crystallization energy (ΔHc) of the second elastomer-modified olefin based resin exceeds 30 J/g, whitening occurs to some extent at the time of shaping, and the cohesion degree of the separation interface is medium and therefore cohesive failure of the separation interface hardly occurs. In other words, separation tends to occur at the interface of the metal foil layer and the inner sealant layer at the time of separation, and separation continuing from the separation point of the interface as a starting point readily progresses (see Comparative Example 7).

Further, when the first elastomer-modified olefin based resin having a crystallization temperature (Tcp) of 105° C. or higher and a crystallization energy (ΔHc) of 50 J/g or more is not contained, whitening occurs to some extent at the time of shaping, the cohesion degree of the separation interface is medium, the cohesion failure of the separation interface hardly occurs, i.e., separation tends to occur at the interface of the metal foil layer and the inner sealant layer at the time of separation, and separation continuing from the separation point of the interface as a starting point readily progresses, and further the second resin layer 8 tends to be readily crushed and the insulation property tends to become insufficient (see Comparative Example 2).

Further, when the second elastomer-modified olefin based resin having a crystallization temperature (Tcp) of 85° C. or higher and a crystallization energy (ΔHc) of 30 J/g or less is not contained, whitening occurs markedly at the time of shaping, the cohesion degree of the separation interface is medium, the cohesion failure of the separation interface hardly occurs, i.e., separation tends to readily occur at the interface of the metal foil layer and the inner sealant layer at the time of separation, and there is a problem that separation continuing from the separation point of the interface as a starting point readily progresses (see Comparative Example 3).

Therefore, in the first invention, the second resin layer 8 is formed by a mixed resin containing a first elastomer-modified olefin based resin having a crystallization temperature (Tcp) of 105° C. or higher and a crystallization energy (ΔHc) of 50 J/g ore more and a second elastomer-modified olefin based resin having a crystallization temperature (Tcp) of 85° C. or higher and a crystallization energy (ΔHc) of 30 J/g or less.

It is preferable that the crystallization temperature of the first elastomer-modified olefin based resin be 105° C. or higher and 135° C. or lower. It is preferable that the crystallization energy of the first elastomer-modified olefin based resin be 50 J/g or more and 75 J/g or less. It is preferable that the melting point of the second elastomer-modified olefin based resin be 85° C. or higher and 125° C. or lower. It is preferable that the crystallization energy of the second elastomer-modified olefin based resin be 5 J/g or more and 30 J/g or less, more preferably 10 J/g or more and 25 J/g or less, especially preferably 10 J/g or more and 20 J/g or less.

As to the first elastomer-modified olefin based resin and the second elastomer-modified olefin based resin, the mode of the "elastomer-modified" may be graft polymerization or other modified modes.

The first elastomer-modified olefin based resin and the second elastomer-modified olefin based resin may be produced by, for example, the following reactor-made method. This is merely one example, and they are not specifically limited by resins produced by such a production method.

Initially, a Ziegler-Natta catalyst, a cocatalyst, and propylene are supplied to a first reactor to polymerize homopolypropylene. The obtained homopolypropylene is moved to a second reactor in a state in which unreacted propylene and Ziegler-Natta catalyst are contained.

In the second reactor, propylene is further added to polymerize homopolypropylene. The obtained homopolypropylene is moved to a third reactor in a state in which unreacted propylene and Ziegler-Natta catalyst are contained.

In the third reactor, by further adding ethylene and propylene to polymerize the ethylene-propylene rubber (EPR) in which ethylene and propylene are copolymerized, the first elastomer-modified olefin based resin or the second elastomer-modified olefin based resin can be produced. The first elastomer-modified olefin based resin can be produced by adding a solvent in a liquid phase, and the second elastomer-modified olefin based resin can be produced by reacting in a gas phase without using a solvent.

In the second resin layer 8, it is preferable that the content rate of the second elastomer-modified olefin based resin be 1 mass % to 50 mass %, more preferably 5 mass % to 30 mass %, especially preferably 10 mass % to 25 mass %.

In the second resin layer 8, it is preferable that the content rate of the first elastomer-modified olefin based resin be 99 mass % to 50 mass %, more preferably 95 mass % to 70 mass %, especially preferably 90 mass % to 75 mass %.

The second resin layer 8 is preferably in the form of a sea-island structure. With this sea-island structure, when the seal portion is broken due to the excessive increase of the inner pressure, in the second resin layer 8, a breakage occurs at the interface of the olefin based resin phase and the elastomer phase, causing cohesive failure at the inside of the second resin layer 8. This hardly causes breakage (separation) at the interface of the metal foil layer and the inner sealant layer. Therefore, when a breakage (separation) for bursting prevention occurs, an effect that a breakage continuing from the broken point as a starting point unlikely progresses can be obtained sufficiently. In the sea-island structure, a form that the elastomer (component) forms an island is preferred.

It is preferable that the second elastomer-modified olefin based resin have two or more crystallization peaks in a DSC (differential scanning calorimeter) measurement graph. When it has two crystallization peaks, it is preferable that the crystallization peak (crystallization temperature Tcp2) on the high temperature side be 90° C. or higher and the crystallization peak (crystallization temperature Tcp1) on the low temperature side be 80° C. or lower. When it has three crystallization peaks, it is preferable that the crystallization peak (crystallization temperature) on the highest temperature side be 90° C. or higher and the crystallization peak (crystallization temperature) on the lowest temperature side be 80° C. or lower.

The integrated value (area) of the crystallization peak curve becomes the crystallization energy (ΔHc). And in cases where there exist two crystallization peaks in the DSC measurement graph, the integrated value of the crystallization peak (Tcp1) curve lower in temperature is the crystallization energy "ΔHc1", and the integrated value of the crystallization peak (Tcp2) curve higher in temperature is the crystallization energy "ΔHc2" (see Tables 1 and 2).

[Sealant Film for Packaging Material According to Second Invention]

Next, a sealant film for a packaging material according to a second invention will be described hereinafter. In this second invention, the inner sealant layer (sealant film) (inner layer) 3 is made of a two or more layered laminated body including a first resin layer 7, a second resin layer 8. The first resin layer 7 contains 50 mass % or more of a random copolymer containing "propylene" and "another copolymer component other than propylene" as copolymer components.

In the sealant film for a packaging material according to the second invention, the second resin layer 8 is made of either the following compositions a) or b).

a) a composition containing a first elastomer-modified olefin based resin having a crystallization temperature (Tcp) of 105° C. or higher and a crystallization energy (ΔHc) of 50 J/g or more, and a specific polymer component b) a composition containing a first elastomer-modified olefin based resin having a crystallization temperature (Tcp) of 105° C. or higher and a crystallization energy (ΔHc) of 50 J/g or more, a second elastomer-modified olefin based resin having a crystallization temperature (Tcp) of 85° C. or higher and a crystallization energy (ΔHc) of 30 J/g or less, and a specific polymer component As the specific polymer component, at least one kind of polymer component selected from the group consisting of a random copolymer containing "propylene" and "another copolymer component other than propylene" as copolymer components homopolypropylene, olefin based elastomer, and styrene based elastomer.

As the "another copolymer component other than propylene" in the random copolymer, although not specifically limited, it can be exemplified by, for example, olefin component, such as, e.g., ethylene, 1-butene, 1-hexene, 1-pentene, and 4-methyl-1-pentene, as well as butadiene. As the olefin based elastomer, for example, an ethylene-propylene rubber (EPR), an ethylene-1-butene rubber (EBR), an ethylene-propylene-diene rubber (EPDM), an isoprene rubber (IR), butadiene rubber (BR), a butyl rubber (IIR), etc., can be exemplified. Further, as the styrene based elastomer, for example, a styrene-ethylene-butylene-styrene copolymer (SEBS), a styrene-butadiene rubber (SBR), etc., can be exemplified.

In the second invention, in the second resin layer 8, even in the case of either configuration a) or b), it contains the aforementioned specific polymer component. Therefore, as compared with the system not containing the specific polymer component (Examples 1, 4, and 5), when the seal portion is broken due to the excessive increase of the inner pressure of the pair of packaging materials in which the mutual inner sealant layers are heat-sealed joined, cohesive failure occurs adequately in the second resin layer 8 (inside of the sealant layer) (which is apparent from the comparison of Examples 1, 4, and 5 and Examples 10 to 38), and whitening at the time of shaping can be adequately suppressed (which is apparent from the comparison of Examples 1, 4, and 5 and Examples 10 to 38).

It is preferable that the innermost layer of the inner sealant layer (inner layer) 3 be formed by the first resin layer 7 (see FIGS. 1 and 2).

It is preferable that the first elastomer-modified olefin based resin (first polypropylene block copolymer) be made of elastomer-modified homopolypropylene and/or elastomer-modified random copolymer. The elastomer-modified random copolymer is an elastomer-modified product of a random copolymer containing "propylene" and "another copolymer component other than propylene" as copolymer components. As the "another copolymer component other than propylene", although not specifically limited, it can be exemplified by, for example, butadiene, other than olefin component, such as, e.g., ethylene, 1-butene, 1-hexene, 1-pentene, and 4-methyl-1-pentene. As the elastomer, although not specifically limited, it is preferable to use EPR (ethylene-propylene rubber).

It is preferable that the second elastomer-modified olefin based resin (second polypropylene block copolymer) be made of elastomer-modified homopolypropylene and/or elastomer-modified random copolymer. The elastomer-modified random copolymer is an elastomer-modified product of a random copolymer containing "propylene" and "another copolymer component other than propylene" as copolymer components. As the "another copolymer component other than propylene", although not specifically limited, it can be exemplified by, for example, butadiene, as well as olefin component, such as, e.g., ethylene, 1-butene, 1-hexene, 1-pentene, and 4-methyl-1-pentene. As the elastomer, although not specifically limited, it is preferable to use EPR (ethylene-propylene rubber).

The first resin layer 7 has a structure containing 50 mass % or more of a random copolymer containing "propylene" and "another copolymer component other than propylene" as copolymer components. As the "another copolymer component other than propylene", although not specifically limited, it can be exemplified by, for example, butadiene, other than olefin component, such as, e.g., ethylene, 1-butene, 1-hexene, 1-pentene, and 4-methyl-1-pentene. When the content rate of the random copolymer is 50 mass % or more, an adequate heat seal strength can be secured. Among other things, it is preferable that the content rate of the random copolymer in the first resin layer 7 be set to 70 mass % or more. It is preferable that the random copolymer (random copolymer containing propylene and another copolymer component other than propylene as copolymer components) be a random copolymer having two or more melting points. In this case, it is possible to obtain effects that the heat seal performance can be further improved by the random copolymer component having a low melting point (the heat seal strength can be further increased) and the first resin layer 7 is unlikely crushed at the time of heat sealing by the random copolymer component having a high melting point and therefore more adequate insulation properties can be secured.

In the second invention, in cases where the second resin layer 8 is made of either the following composition a) or b), when the crystallization temperature of the first elastomer-modified olefin based resin is less than 105° C., whitening occurs to some extent at the time of shaping, and the second resin layer 8 tends to be crushed at the time of heat sealing, which tends to become insufficient in insulation property (see Comparative Example 14). Further, when the crystallization energy ($\Delta$Hc) of the first elastomer-modified olefin based resin is less than 50 J/g, the cohesion degree of the separation interface is medium, and therefore cohesive failure of the separation interface hardly occurs. In other words, separation tends to occur at the interface of the metal foil layer and the inner sealant layer at the time of separation, separation continuing from the separation point of the interface as a starting point readily progresses, and further the second layer 8 is readily crushed and therefore the insulation properties tend to become insufficient (see Comparative Example 16).

In the second invention, in cases where the second resin layer 8 is made of the aforementioned composition b), when the crystallization temperature of the second elastomer-modified olefin based resin is less than 85° C., whitening occurs to some extent at the time of shaping (see Comparative Example 15). Further, when the crystallization energy ($\Delta$Hc) of the second elastomer-modified olefin based resin exceeds 30 J/g, whitening occurs to some extent at the time of shaping (see Comparative Example 17).

Further, when the second resin layer 8 does not contain the first elastomer-modified olefin resin having a crystallization temperature (Tcp) of 105° C. or higher and a crystallization energy ($\Delta$Hc) of 50 J/g or more, whitening occurs to some extent at the time of shaping, the cohesion degree of the separation interface is medium, the cohesion failure of the separation interface hardly occurs. In other words, separation tends to occur at the interface of the metal foil layer and the inner sealant layer at the time of separation, separation continuing from the separation point of the interface as a starting point readily progresses, and further the second layer 8 is readily crushed and therefore the insulation properties tend to become insufficient (see Comparative Example 13).

It is preferable that the crystallization temperature of the first elastomer-modified olefin based resin be 105° C. or higher and 135° C. or lower. It is preferable that the crystallization energy of the first elastomer-modified olefin based resin be 50 J/g or more and 75 J/g or less. It is preferable that the crystallization temperature of the second elastomer-modified olefin based resin be 85° C. or higher and 125° C. or lower. It is preferable that the crystallization energy of the second elastomer-modified olefin based resin be 5 J/g or more and 30 J/g or less, more preferably 10 J/g or more and 25 J/g or less, especially preferably 10 J/g or more and 20 J/g or less.

As to the first elastomer-modified olefin based resin and the second elastomer-modified olefin based resin, the mode of the "elastomer-modified" may be graft polymerization or other modified modes.

The first elastomer-modified olefin based resin and the second elastomer-modified olefin based resin may be produced by, for example, the following reactor-made method. This is merely one example, and they are not specifically limited by resins produced by such a production method.

Initially, a Ziegler-Natta catalyst, a cocatalyst, propylene, and hydrogen are supplied to a first reactor to polymerize homopolypropylene. The obtained homopolypropylene is moved to a second reactor in a state in which unreacted propylene and Ziegler-Natta catalyst are contained. In the second reactor, propylene and hydrogen are further added to polymerize homopolypropylene. The obtained homopolypropylene is moved to a third reactor in a state in which unreacted propylene and Ziegler-Natta catalyst are contained. In the third reactor, by further adding ethylene, propylene and hydrogen to polymerize the ethylene-propylene rubber (EPR) in which ethylene and propylene are copolymerized, the first elastomer-modified olefin based resin or the second elastomer-modified olefin based resin can be produced. The first elastomer-modified olefin based resin can be produced by adding a solvent in a liquid phase, and the second elastomer-modified olefin based resin can be produced by reacting in a gas phase without using a solvent.

In the second resin layer 8, it is preferable that the content rate of the first elastomer-modified olefin based resin be 99 mass % to 50 mass %, more preferably 95 mass % to 70 mass %, especially preferably 90 mass % to 75 mass %.

In the second resin layer 8, it is preferable that the content rate of the polymer component be 1 mass % or more and less than 50 mass %, more preferably 5 mass % or more and 45 mass % or less, especially preferably 10 mass % or more and 30 mass % or less.

In the second resin layer 8, in cases where the second elastomer-modified olefin resin is contained, it is preferable that the content rate of the second elastomer-modified olefin based resin in the second resin layer 8 be 1 mass % to 50 mass %, more preferably 5 mass % to 30 mass %, especially preferably 10 mass % to 25 mass %.

The second resin layer 8 is preferably in the form of a sea-island structure. With this sea-island structure, when the seal portion is broken due to the excessive increase of the inner pressure, in the second resin layer 8, a breakage occurs at the interface of the olefin based resin phase and the elastomer phase, causing cohesive failure at the inside of the second resin layer 8. Therefore, breakage (separation) at the interface of the metal foil layer and the inner sealant layer occurs hardly. Therefore, when a breakage (separation) for bursting prevention occurs, an effect that a breakage continuing from the broken point as a starting point unlikely progresses can be obtained sufficiently. In the sea-island structure, a form that the elastomer (component) forms an island is preferred.

It is preferable that the second elastomer-modified olefin based resin have two or more crystallization peaks in a DSC (differential scanning calorimeter) measurement graph. When it has two crystallization peaks, it is preferable that the crystallization peak (crystallization temperature) on the highest temperature side be 90° C. or higher and the crystallization peak (crystallization temperature) on the lowest temperature side be 80° C. or lower. When it has three or more crystallization peaks, it is preferable that the crystallization peak (crystallization temperature) on the highest temperature side be 90° C. or higher and the crystallization peak (crystallization temperature) on the lowest temperature side be 80° C. or lower.

[Sealant Film for Packaging Material According to First Invention and Second Invention]

In the sealant film of the first invention and the sealant film of the second invention, it is preferable that the first resin layer 7 be structured not in the form of a sea-island structure. In such a case, it is possible to adequately suppress generation of voids (spaces) at the interface of the olefin resin phase and the elastomer phase in the first resin layer when the peripheral edge portion (including the flange portion 29) is bent after sealing the power storage device main body 31 by accommodating the power storage device main body 31 in the packaging material 1 and/or the packaging case 10 and heat sealing the peripheral edge portion (including the flange portion 29. Therefore, there is a merit that the insulation property can be secured adequately. Especially, in cases where it is structured such that the first resin layer 7 is arranged at the position adjacent to the metal foil layer 7, the aforementioned effect becomes significant.

In the sealant film of the first and second inventions, it is preferable that the first resin layer 7 contains an anti-blocking agent and a slip agent together with the random copolymer. Further, it is preferable that the second resin layer 8 further contains a slip agent.

As the anti-blocking agent, although not specifically limited, for example, silica, aluminum silicate, etc., can be exemplified. As the slip agent, although not specifically limited, for example, fatty acid amide such as erucicamide, stearic acid amide, and oleic amide, and waxes such as crystalline wax and polyethylene wax can be exemplified.

In the sealant film of the first and second inventions, it is preferable that the sealant film constituting the inner sealant layer (inner layer) 3 be produced by a molding method, such as, e.g., a multilayer extrusion molding, an inflation molding, and a T-die cast film molding.

In the sealant film of the first and second inventions, it is preferable that the thickness of the inner sealant layer (inner layer) 3 be set to 20 μm to 80 μm. By setting it to 20 μm or more, generation of pinholes can be prevented adequately, and by setting it to 80 μm or less, the resin used amount can be reduced, which in turn can attain the cost reduction. Among other things, it is especially preferable that the thickness of the inner sealant layer (inner layer) 3 be set to 30 μm to 50 μm.

In the sealant film of the first and second invention, when the inner sealant layer (inner layer) 3 is a three-layer laminate structure formed by a second resin layer 8, a first resin layer 7 laminated on one surface of the second resin layer 8, and a first resin layer 7 laminated on the other surface of the second resin layer 8, it is preferable that the thickness ratio of the first resin layer 7/the second resin layer 8/the first resin layer 7 be within a range of 0.5/9/0.5 to 3/4/3.

In the sealant film of the first and second invention, as a method for laminating the sealant film constituting the inner sealant layer (inner layer) 3 on the metal foil layer 4, although not specifically limited, a dray lamination method, a sandwich lamination method (a method in which an adhesive film of acid-modified polypropylene is extruded, the adhesive film is sand-laminated between the metal foil and the sealant film and heat laminated by heat rollers), etc., can be exemplified.

[Packaging Material for Power Storage Device According the Present Invention]

In the packaging material for a power storage device according to the present invention, it is preferable that the base material layer (outer layer) 2 be made of a heat-resistant resin layer. As the heat-resistant resin constituting the heat-resistant resin layer 2, a heat-resistant resin that does not melt at the heat seal temperature at the time of heat sealing the packaging material is used. As the heat-resistant resin, it is preferable to use a heat-resistant resin having a melting point higher than the melting point of the thermoplastic resin constituting the inner sealant layer 3 by 10° C. or more, especially preferably a heat-resistant resin having a melting point higher than the melting point of the thermoplastic resin constituting the inner sealant layer 3 by 20° C. or more.

As the heat-resistant resin layer (outer layer) 2, although not specifically limited, for example, a polyamide film such as a nylon film, and a polyester film can be exemplified, and these stretched films are preferably used. Among other things, as the heat-resistant resin layer 2, it is especially preferable to use a biaxially stretched polyamide film such as a biaxially stretched nylon film, a biaxially stretched polybutylene terephthalate (PBT) film, a biaxially stretched polyethylene terephthalate (PET) film, or a biaxially stretched polyethylene naphthalate (PEN) film. As the nylon film, although not specifically limited, for example, a 6 nylon film, a 6, 6 nylon film, a MXD nylon film can be exemplified. The heat-resistant resin layer 2 may be a single layer, or a multi-layer made of, for example, polyester film/polyamide film (e.g., multi-layer made of PET film/nylon film).

The thickness of the base material (outer layer) 2 is preferably 2 µm to 50 µm. In the case of using a polyester film, the thickness is preferably 2 µm to 50 µm, and in the case of using a nylon film, the thickness is preferably 7 µm to 50 µm. By setting it to the aforementioned preferable lower limit value or above, adequate strength as a packaging material can be secured. By setting it to the aforementioned preferable upper limit value or below, the stress at the time of shaping, such as stretch forming and drawing, can be reduced, which in turn can improve the formability.

In the packaging material for a power storage device according to the present invention, the metal foil layer 4 plays the role of giving a gas barrier property of preventing invasion of oxygen and moisture into the packaging material 1. As the metal foil layer 4, although not specifically limited, for example, an aluminum foil, a SUS foil (stainless steel foil), a copper foil, etc., can be exemplified. Among other things, it is preferable to use an aluminum foil or a SUS foil (stainless steel foil). The thickness of the metal foil layer 4 is preferably 20 µm to 100 µm. By being 20 µm or more, pinhole generation can be prevented at the time of rolling for producing a metal foil, and by being 100 µm or less, the stress at the time of shaping such as stretch forming and drawing can be reduced, which in turn can improve the formability.

In the metal foil layer 4, it is preferable that at least inner side surface (surface on the second adhesive agent layer 6 side) is subjected to a chemical conversion treatment. By being subjected to such a chemical conversion treatment, corrosion of the metal foil surface by the contents (electrolyte, etc., of a battery) can be prevented adequately. A metal foil is subjected to a chemical conversion treatment by executing, for example, the following processing. That is, for example, one of the following solutions 1) to 3) was applied onto the surface of the metal foil to which a degreasing treatment was performed, and then dried to execute a chemical conversion treatment.

1) an aqueous solution of a mixture including
    phosphoric acid,
    chromic acid, and
    at least one kind of compounds selected from the group consisting of metal salt of fluoride and non-metallic salt of fluoride
2) an aqueous solution of a mixture including
    phosphoric acid,
    at least one kind of resins selected from the group consisting of an acrylic based resin, a chitosan derivative resin, and a phenol based resin, and
    at least one kind of compounds selected from the group consisting of chromic acid and chromium (III) salt
3) an aqueous solution of a mixture including
    phosphoric acid,
    at least one kind of resin selected from the group consisting of an acrylic based resin, a chitosan derivative resin, and a phenol based resin,
    at least one kind of compound selected from the group consisting of chromic acid and chromium (III) salt, and
    at least one kind of compound selected from the group including metal salt of fluoride and non-metallic salt of fluoride In the chemical conversion film, it is preferable that the chromium deposition amount (per one surface) be 0.1 mg/m$^2$ to 50 mg/m$^2$, especially 2 mg/m$^2$ to 20 mg/m$^2$.

As the first adhesive agent layer 5, although not specifically limited, for example, a polyurethane adhesive layer, a polyester polyurethane adhesive layer, and a polyether polyurethane adhesive layer can be exemplified. It is preferable that the thickness of the first adhesive agent layer 5 be set to 1 µm to 5 µm. Among other things, from the viewpoint of the thinning and lightweighting of the packaging material 1, it is especially preferable that the thickness of the first adhesive agent layer 5 be set to 1 µm to 3 µm.

As the second adhesive agent layer 6, although not specifically limited, for example, a layer exemplified by the first adhesive agent layer 5 can be used. It is preferable to use polyolefin-based adhesive less swelling by electrolyte. It is preferable that the thickness of the second adhesive agent layer 6 be set to 1 µm to 5 µm. Among other things, from the viewpoint of the thinning and lightweighting of the packaging material 1, it is especially preferable that the thickness of the second adhesive agent layer 6 be set to 1 µm to 3 µm.

By shaping (deep drawing, stretch forming, etc.) the packaging material 1 of the present invention, a packaging case (battery case, etc.) 10 can be obtained (see FIG. 4). The packaging material 1 of the present invention can be used as it is without being subjected to shaping (see FIG. 4).

Figure 3:
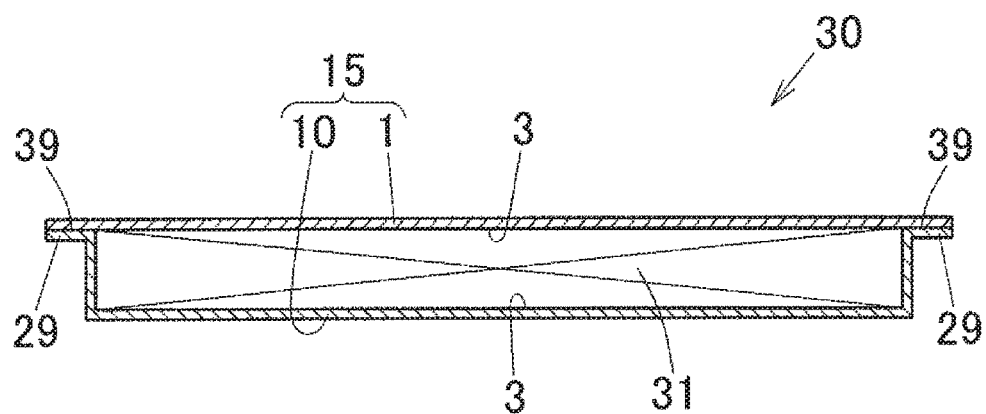
FIG. 3 is a cross-sectional view of a power storage device according to one embodiment of the present invention.

One embodiment of a power storage device 30 structured by using the packaging material 1 according the present invention is shown in FIG. 3. This power storage device 30 is a lithium-ion secondary battery. In this Embodiment, as shown in FIGS. 3 and 4, the packaging member 15 is constituted by the packaging case 10 obtained by shaping the packaging material 1 and the packaging material 1 in a plane shape. An approximate rectangular shaped power storage device main body (electrochemical device, etc.) 31 is accommodated in the accommodation recess of the packaging case 10 obtained by shaping the packaging material 1 of the present invention. On the power storage device main body 31, the packaging material 1 of the present invention is arranged with its inner sealant layer 3 side facing inward (downward) without being shaped. And the peripheral edge portion of the inner sealant layer 3 of the planar packaging material 1 and the inner sealant layer 3 of the flange portion (sealing peripheral edge portion) 29 of the packaging case 10 are heat-sealed joined and sealed by heat sealing. Thus, the power storage device 30 of the present invention is structured (see FIGS. 3 and 4). The inner side surface of the accommodation recess of the packaging case 10 is constituted by the inner sealant layer 3, and the outer surface of the accommodation recess is constituted by the base material layer (outer layer) 2 (see FIG. 4).

In FIG. 3, the reference numeral "39" denotes a heat-sealed portion in which the peripheral edge portion of the packaging material 1 and the flange portion (sealing peripheral edge portion) 29 of the packaging case 10 are joined (welded). In the power storage device 30, a tip end portion of a tab lead connected to the power storage device main body 31 is drawn to an outside of the packaging member 15, which is not illustrated.

As the power storage device main body 31, although not specifically limited, for example, a battery body part, a capacitor main body, a condenser main body, etc., can be exemplified.

It is preferable that the width of the heat sealed portion 39 is set to 0.5 mm or more. By setting it to 0.5 mm or more, sealing can be performed assuredly. Among other things, it is preferable that the width of the heat sealed portion 39 be set to 3 mm to 15 mm.

In the aforementioned Embodiment, the packaging member 15 is constituted by the packaging case 10 obtained by shaping the packaging material 1 and the planar packaging material 1 (see FIGS. 3 and 4). However, it is not limited to such a combination, and for example, the packaging member 15 may be structured by a pair of planar packaging materials 1, or may be structured by a pair of packaging cases 10.

Next, preferable examples of the production method of a sealant film resin composition (second resin layer resin composition) of a packaging material for a power storage device will be described below.

In the first production method, one or two or more kinds of elastomer components and one or two or more kinds of plastomer components are melt-kneaded to obtain a first melt-kneaded product (Preliminary melt-kneading step).

Next, a first melt-kneaded product obtained in the preliminary melt-kneading step and a first elastomer-modified olefin based resin having a crystallization temperature of 105° C. or higher and a crystallization energy of 50 J/g or more are mixed (other than a normal mixing, the mixing may be performed by melt-kneading, etc.) to obtain a resin composition. In this first production method, it is preferable that the first elastomer-modified olefin based resin be made of elastomer-modified homopolypropylene and/or elastomer-modified random copolymer. The elastomer-modified random copolymer is an elastomer-modified product of a random copolymer containing propylene and another copolymer component other than propylene as copolymer components (the detail structure of the first elastomer-modified olefin based resin is described above).

In the second production method, one or two or more kinds of elastomer components and one or two or more kinds of plastomer components are melt-kneaded to obtain a first melt-kneaded product (Preliminary melt-kneading step).

Next, a resin composition is obtained by mixing (other than a normal mixing, it can be mixed by melt-kneading, etc.) the first melt-kneaded product obtained by the preliminary melt-kneading step, a first elastomer-modified olefin based resin having a crystallization temperature of 105° C. or higher and a crystallization energy of 50 J/g or more, and a second elastomer-modified olefin based resin having a crystallization temperature of 85° C. or higher and a crystallization energy of 30 J/g or less. In this second production method, it is preferable that the first elastomer-modified olefin based resin be made of elastomer-modified homopolypropylene and/or elastomer-modified random copolymer. It is preferable that the second elastomer-modified olefin based resin be made of elastomer-modified homopolypropylene and/or elastomer-modified random copolymer. The elastomer-modified random copolymer is an elastomer-modified product of a random copolymer containing propylene and another copolymer component other than propylene as copolymer components (the detail structure of the first and second elastomer-modified olefin based resins is described above).

In the first and second production methods, it is preferable that the elastomer component used in the preliminary melt-kneading step be one, two or more kinds of elastomer component selected from the group consisting of an olefin based elastomer, a styrene based elastomer, and a second elastomer-modified olefin based resin having a crystallization temperature of 85° C. or higher and a crystallization energy of 30 J/g or less. It is preferable that the second elastomer-modified olefin based resin which can be used in the preliminary melt-kneading step be made of elastomer-modified homopolypropylene and/or elastomer-modified random copolymer. The elastomer-modified random copolymer is an elastomer-modified product of a random copolymer containing propylene and another copolymer component other than propylene as copolymer components (the detail structure of the second elastomer-modified olefin based resin is described above). As the olefin based elastomer, for example, an ethylene-propylene rubber (EPR), an ethylene-1-butene rubber (EBR), an ethylene-propylene-diene rubber (EPDM), an isoprene rubber (IR), a butadiene rubber (BR), a butyl rubber (IIR), etc., can be exemplified. Further, as the styrene based elastomer, for example, a styrene-ethylene-butylene-styrene copolymer (SEBS), a styrene-butadiene rubber (SBR), etc., can be exemplified.

In the first and second production methods, it is preferable that the plastomer component used in the preliminary melt-kneading step is one, two or more kinds of plastomer components selected from the group consisting of random polypropylene, homopolypropylene, and a first elastomer-modified olefin based resin having a crystallization temperature of 105° C. or higher and a crystallization energy of 50 J/g or more. It is preferable that the first elastomer-modified olefin based resin which can be used in the preliminary melt-kneading step be made of elastomer-modified homopolypropylene and/or elastomer-modified random copolymer. The elastomer-modified random copolymer is an elastomer-modified product of a random copolymer containing propylene and another copolymer component other than propylene as copolymer components (the detail structure of the first elastomer-modified olefin based resin is described above). The random polypropylene that can be used in the preliminary melt-kneading step is a random copolymer containing "propylene" and "another copolymer component other than propylene" as copolymer components. As to the "another copolymer component other than propylene", although not specifically limited, it can be exemplified by, for example, butadiene, other than olefin component, such as, e.g., ethylene, 1-butene, 1-hexene, 1-pentene, and 4-methyl-1-pentene.

In the preliminary melt-kneading step, it is preferable that a mixing mass ratio of elastomer component/plastomer component be set within a range of 5/95 to 70/30.

Further, in this first production method, it is preferable that a mixing mass ratio of the first melt-kneaded product/the first elastomer-modified olefin based resin be set within a range of 5/95 to 40/60.

Further, in this second production method, it is preferable that 95 parts by weight to 50 parts by weight of the first elastomer-modified olefin based resin and 5 parts by weight to 50 parts by weight of the second elastomer-modified olefin based resin be mixed to 100 parts by weight of the first melt-kneaded product.

In the aforementioned production method, a material obtained by, e.g., cutting the portion that will not be commercialized, such as, an ear portion and an off-gauge portion generated when producing the aforementioned "sealant film for a packaging material of a power storage device" of the present invention (the two or more layer laminated body including the first resin layer 7 and the second resin layer 8), and then crushing to obtain crushed materials, and further granulating the crushed materials in a semi-molten state, can be used as the kneading material in the preliminary melt-kneading step.

EXAMPLES

Next, concrete examples of the present invention will be explained. It should be noted, however, that the present invention was not specifically limited to these examples.

Example 1

On both surfaces of an aluminum foil 4 having a thickness of 35 μm, a chemical conversion treatment solution including phosphoric acid, polyacrylic acid (acrylic based resin), chromium (III) salt compound, water, and alcohol is applied, and then dried at 180° C. to form a chemical conversion film. The chromium deposition amount of this chemical conversion film was 10 mg/m$^2$ per one surface.

Next, on one surface of the chemical conversion treated aluminum foil 4, a biaxially stretched 6 nylon film 2 having a thickness of 15 μm was dry laminated (bonded) via a two-part curing type urethane based adhesive 5.

Next, a first resin layer 7 having a thickness of 4 μm and made of ethylene-propylene random copolymer, a second resin layer 8 having a thickness of 22 μm (second resin layer 8 having a composition of 99 mass % of a first elastomer-modified olefin based resin having a crystallization temperature of 114° C. and a crystallization energy of 54.2 J/g and 1 mass % of a second elastomer-modified olefin based resin having a crystallization temperature of 96° C. and a crystallization energy of 15 J/g), and a first resin layer 7 having a thickness of 4 μm made of ethylene-propylene random copolymer were co-extruded using a T-die so that these layers are three-layered in this order. Thus, a sealant film having a thickness of 30 μm in which these three layers were laminated (first resin layer/second resin layer/first resin layer). Thereafter, one of surfaces of the first resin layer 7 of the sealant film 3 was overlapped on the other surface of the dry laminated aluminum foil 4 by a two-part curing type maleic acid-modified polypropylene adhesive agent 6, and pinched by and between a rubber nip roll and a lamination roll heated to 100° C. to be press-bonded and dry laminated. Thereafter, by performing aging (heating) at 50° C. for 5 days, a packaging material 1 for a power storage device having a structure shown in FIG. 2 was obtained.

As the two-part curing type maleic acid-modified polypropylene adhesive agent, using an adhesive agent solution in which 100 parts by weight of maleic acid-modified polypropylene (melting point 80° C., acid value 10 mgKOH/g) as a base resin, 8 parts by weight of hexamethylene diisocyanate isocyanurate (NCO content rate: 20 mass %) as a curing agent, and further a solvent were mixed, the adhesive agent solution was applied on the other surface of the aluminum foil 4 so that the solid content applied amount became 2 g/m$^2$, and heated and dried, and then overlapped on one surfaces of the first resin layer 7 of the sealant film 3.

Example 2

A packaging material 1 for a power storage device structured shown in FIG. 2 was obtained in the same manner as in Example 1 except for using, as a second resin layer 8, a second resin layer having a thickness of 22 μm (second resin layer having a composition of 90 mass % of a first elastomer-modified olefin based resin having a crystallization temperature of 114° C. and a crystallization energy of 54.2 J/g and 10 mass % of a second elastomer-modified olefin based resin having a crystallization temperature of 96° C. and a crystallization energy of 15 J/g).

Comparative Example 1

A packaging material for a power storage device was obtained in the same manner as in Example 2 except for using, as a resin constituting the first resin layer 7, a first elastomer-modified olefin based resin having a crystallization temperature of 114° C. and a crystallization energy of 54.2 J/g in place of ethylene-propylene random copolymer.

Comparative Example 2

A packaging material for a power storage device was obtained in the same manner as in Example 1 except for using, as a second resin layer 8, a second resin layer having a thickness of 22 μm (second resin layer made of a second elastomer-modified olefin based resin having a crystallization temperature of 96° C. and a crystallization energy of 15 J/g).

Comparative Example 3

A packaging material for a power storage device was obtained in the same manner as in Example 1 except for using, as a second resin layer 8, a second resin layer having a thickness of 22 μm (second resin layer made of a first elastomer-modified olefin based resin having a crystallization temperature of 114° C. and a crystallization energy of 54.2 J/g).

Example 3

A packaging material 1 for a power storage device structured shown in FIG. 2 was obtained in the same manner as in Example 1 except for using, as a second resin layer 8, a second rein layer having a thickness of 22 μm (second resin layer having a composition of 90 mass % of a first elastomer-modified olefin based resin having a crystallization temperature of 106° C. and a crystallization energy of 54.0 J/g and 10 mass % of a second elastomer-modified olefin based resin having a crystallization temperature of 96° C. and a crystallization energy of 15 J/g).

Comparative Example 4

A packaging material 1 for a power storage device structured shown in FIG. 2 was obtained in the same manner as in Example 1 except for using, as a second resin layer 8, a second resin layer having a thickness of 22 μm (second resin layer having a composition of 90 mass % of a first elastomer-modified olefin based resin having a crystallization temperature of 96° C. and a crystallization energy of 53.0 J/g and 10 mass % of a second elastomer-modified olefin based resin having a crystallization temperature of 96° C. and a crystallization energy of 15 J/g).

Example 4

A packaging material 1 for a power storage device structured shown in FIG. 2 was obtained in the same manner as in Example 1 except for using, as a second resin layer 8, a second resin layer having a thickness of 22 μm (second resin layer having a composition of 90 mass % of a first elastomer-modified olefin based resin having a crystallization temperature of 114° C. and a crystallization energy of 54.2 J/g and 10 mass % of a second elastomer-modified olefin based resin having a crystallization temperature of 88° C. and a crystallization energy of 14 J/g).

Comparative Example 5

A packaging material 1 for a power storage device structured shown in FIG. 2 was obtained in the same manner as in Example 1 except for using, as a second resin layer 8, a second resin layer having a thickness of 22 μm (second resin layer having a composition of 90 mass % of a first elastomer-modified olefin based resin having a crystallization temperature of 114° C. and a crystallization energy of 54.2 J/g and 10 mass % of a second elastomer-modified olefin based resin having a crystallization temperature of 83° C. and a crystallization energy of 10 J/g).

Comparative Example 6

A packaging material for a power storage device structured was obtained in the same manner as in Example 1 except for using, as a second resin layer 8, a second resin layer having a thickness of 22 μm (second resin layer having a composition of 90 mass % of a first elastomer-modified olefin based resin having a crystallization temperature of 106° C. and a crystallization energy of 45.5 J/g and 10 mass % of a second elastomer-modified olefin based resin having a crystallization temperature of 96° C. and a crystallization energy of 15 J/g).

Example 5

A packaging material 1 for a power storage device structured shown in FIG. 2 was obtained in the same manner as in Example 1 except for using, as a second resin layer 8, a second resin layer having a thickness of 22 μm (second resin layer having a composition of 80 mass % of a first elastomer-modified olefin based resin having a crystallization temperature of 114° C. and a crystallization energy of 54.2 J/g and 20 mass % of a second elastomer-modified olefin based resin having a crystallization temperature of 96° C. and a crystallization energy of 15 J/g).

Example 6

A packaging material 1 for a power storage device structured shown in FIG. 2 was obtained in the same manner as in Example 1 except for using, as a second resin layer 8, a second resin layer having a thickness of 22 μm (second resin layer having a composition of 70 mass % of a first elastomer-modified olefin based resin having a crystallization temperature of 114° C. and a crystallization energy of 54.2 J/g and 30 mass % of a second elastomer-modified olefin based resin having a crystallization temperature of 96° C. and a crystallization energy of 15 J/g).

Example 7

A packaging material 1 for a power storage device structured shown in FIG. 2 was obtained in the same manner as in Example 1 except for using, as a second resin layer 8, a second resin layer having a thickness of 22 μm (second resin layer having a composition of 80 mass % of a first elastomer-modified olefin based resin having a crystallization temperature of 117° C. and a crystallization energy of 61.2 J/g and 20 mass % of a second elastomer-modified olefin based resin having a crystallization temperature of 96° C. and a crystallization energy of 15 J/g).

Example 8

A packaging material 1 for a power storage device structured shown in FIG. 2 was obtained in the same manner as in Example 1 except for using, as a second resin layer 8, a second resin layer having a thickness of 22 μm (second resin layer having a composition of 70 mass % of a first elastomer-modified olefin based resin having a crystallization temperature of 117° C. and a crystallization energy of 61.2 J/g and 30 mass % of a second elastomer-modified olefin based resin having a crystallization temperature of 96° C. and a crystallization energy of 15 J/g).

Comparative Example 7

A packaging material 1 for a power storage device structured shown in FIG. 2 was obtained in the same manner as in Example 1 except for using, as a second resin layer 8, a second resin layer having a thickness of 22 μm (second resin layer having a composition of 90 mass % of a first elastomer-modified olefin based resin having a crystallization temperature of 114° C. and a crystallization energy of 54.2 J/g and 10 mass % of a second elastomer-modified olefin based resin having a crystallization temperature of 108° C. and a crystallization energy of 40 J/g).

Comparative Example 8

A packaging material 1 for a power storage device structured shown in FIG. 2 was obtained in the same manner as in Example 1 except for using, as a second resin layer 8, a second resin layer having a thickness of 22 μm (second resin layer having a composition of 99 mass % of a first elastomer-modified olefin based resin having a crystallization temperature of 114° C. and a crystallization energy of 54.2 J/g and 1 mass % of an EPR having a crystallization temperature of 56° C. and a crystallization energy of 11 J/g).

Comparative Example 9

A packaging material for a power storage device structured was obtained in the same manner as in Example 1 except for using, as a second resin layer 8, a second resin layer having a thickness of 22 μm (second resin layer having a composition of 90 mass % of a first elastomer-modified olefin based resin having a crystallization temperature of 114° C. and a crystallization energy of 54.2 J/g and 10 mass % of an EPR having a crystallization temperature of 56° C. and a crystallization energy of 11 J/g).

Comparative Example 10

A packaging material for a power storage device structured was obtained in the same manner as in Example 1 except for using, as a second resin layer 8, a second resin layer having a thickness of 22 μm (second resin layer having a composition of 80 mass % of a first elastomer-modified olefin based resin having a crystallization temperature of 114° C. and a crystallization energy of 54.2 J/g and 20 mass % of an EPR having a crystallization temperature of 56° C. and a crystallization energy of 11 J/g).

Comparative Example 11

A packaging material for a power storage device was obtained in the same manner as in Example 1 except for using, as a second resin layer 8, a second resin layer having a thickness of 22 μm (second resin layer having a composition of 70 mass % of a first elastomer-modified olefin based resin having a crystallization temperature of 114° C. and a crystallization energy of 54.2 J/g and 30 mass % of an EPR having a crystallization temperature of 56° C. and a crystallization energy of 11 J/g).

Example 9

On both surfaces of an aluminum foil 4 having a thickness of 35 μm, a chemical conversion treatment solution including phosphoric acid, polyacrylic acid (acrylic based resin), chromium (III) salt compound, water, and alcohol was applied, and then dried at 180° C. to form a chemical conversion film. The chromium deposition amount of this chemical conversion film was 10 mg/m² per one surface.

Next, on one surface of the chemical conversion treated aluminum foil 4, a biaxially stretched 6 nylon film 2 having a thickness of 15 μm was dry laminated (bonded) via a two-part curing type urethane based adhesive 5.

Next, a first resin layer 7 having a thickness of 8 μm and made of ethylene-propylene random copolymer, and a second resin layer 8 having a thickness of 22 μm (second resin layer 8 having a composition of 90 mass % of a first elastomer-modified olefin based resin having a crystallization temperature of 114° C. and a crystallization energy of 54.2 J/g and 10 mass % of a second elastomer-modified olefin based resin having a crystallization temperature of 96° C. and a crystallization energy of 15 J/g), were co-extruded using a T-die so that these layers are laminated. Thus, a sealant film having a thickness of 30 μm in which these two layers were laminated (first resin layer 7/second resin layer 8). Thereafter, one of the first resin layer 7 surface of the sealant film 3 was overlapped on the other surface of the dry laminated aluminum foil 4 by a two-part curing type maleic acid-modified polypropylene adhesive agent 6, and pinched by and between a rubber nip roll and a lamination roll heated to 100° C. to be press-bonded and dry laminated. Thereafter, by performing aging (heating) at 50° C. for 5 days, a packaging material 1 for a power storage device having a structure shown in FIG. 1 was obtained.

As the two-part curing type maleic acid-modified polypropylene adhesive agent, using an adhesive agent solution in which 100 parts by weight of maleic acid-modified polypropylene (melting point 80° C., acid value 10 mgKOH/g) as a base resin, 8 parts by weight of hexamethylene diisocyanate isocyanurate (NCO content rate: 20 mass %) as a curing agent, and further a solvent were mixed, the adhesive agent solution was applied on the other surface of the aluminum foil 4 so that the solid content applied amount became 2 g/m², and heated and dried, and then overlapped on one of surfaces of the first resin layer 7 of the sealant film 3.

TABLE 1

| | First resin layer | | First elastomer-modified olefin based resin | | | | Second elastomer-modified olefin based resin | | | | | | | |
|---|---|---|---|---|---|---|---|---|---|---|---|---|---|---|
| | | | | | | Content | | | | | | | | Content |
| | Type | Tmp (° C.) | Type | ΔHc (J/g) | Tcp (° C.) | rate (mass %) | Type | ΔHc1 (J/g) | ΔHc2 (J/g) | ΔHc (J/g) | Tcp1 (° C.) | Tcp2 (° C.) | Tcp (° C.) | rate (mass %) |
| Com. Ex 1 | B-PP1X | — | B-PP1X | 54.2 | 114 | 90 | B-PP2X | 1.7 | 15 | — | 72 | 96 | — | 10 |
| Com. Ex 2 | r-PPA | 144.152 | — | — | — | — | B-PP2X | 1.7 | 15 | — | 72 | 96 | — | 100 |
| Com. Ex. 3 | r-PPA | 144.152 | B-PP1X | 54.2 | 114 | 100 | — | — | — | — | — | — | — | — |
| Ex. 1 | r-PPA | 144.152 | B-PP1X | 54.2 | 114 | 99 | B-PP2X | 1.7 | 15 | — | 72 | 96 | — | 1 |
| Ex. 2 | r-PPA | 144.152 | B-PP1X | 54.2 | 114 | 90 | B-PP2X | 1.7 | 15 | — | 72 | 96 | — | 10 |
| Ex. 3 | r-PPA | 144.152 | B-PP1Z | 54.0 | 106 | 90 | B-PP2X | 1.7 | 15 | — | 72 | 96 | — | 10 |
| Com. Ex. 4 | r-PPA | 144.152 | B-PP1V | 53.0 | 96 | 90 | B-PP2X | 1.7 | 15 | — | 72 | 96 | — | 10 |
| Ex. 4 | r-PPA | 144.152 | B-PP1X | 54.2 | 114 | 90 | B-PP2Y | — | — | 14 | — | — | 88 | 10 |
| Com. Ex. 5 | r-PPA | 144.152 | B-PP1X | 54.2 | 114 | 90 | B-PP2Z | — | — | 10 | — | — | 83 | 10 |
| Com. Ex. 6 | r-PPA | 144.152 | B-PP1W | 45.5 | 106 | 90 | B-PP2X | 1.7 | 15 | — | 72 | 96 | — | 10 |
| Ex. 5 | r-PPA | 144.152 | B-PP1X | 54.2 | 114 | 80 | B-PP2X | 1.7 | 15 | — | 72 | 96 | — | 20 |
| Ex. 6 | r-PPA | 144.152 | B-PP1X | 54.2 | 114 | 70 | B-PP2X | 1.7 | 15 | — | 72 | 96 | — | 30 |
| Ex. 7 | r-PPA | 144.152 | B-PP1Y | 61.2 | 117 | 80 | B-PP2X | 1.7 | 15 | — | 72 | 96 | — | 20 |
| Ex. 8 | r-PPB | 145 | B-PP1Y | 61.2 | 117 | 70 | B-PP2X | 1.7 | 15 | — | 72 | 96 | — | 30 |

TABLE 2

| | First resin layer | | First elastomer-modified olefin based resin | | | | Second elastomer-modified olefin based resin | | | | | | | |
|---|---|---|---|---|---|---|---|---|---|---|---|---|---|---|
| | | | | | | Content | | | | | | | | Content |
| | Type | Tmp (° C.) | Type | ΔHc (J/g) | Tcp (° C.) | rate (mass %) | Type | ΔHc1 (J/g) | ΔHc2 (J/g) | ΔHc (J/g) | Tcp1 (° C.) | Tcp2 (° C.) | Tcp (° C.) | rate (mass %) |
| Com. Ex 7 | r-PPA | 144.152 | B-PP1X | 54.2 | 114 | 90 | B-PP2V | — | — | 40 | — | — | 108 | 10 |
| Com. Ex 8 | r-PPA | 144.152 | B-PP1X | 54.2 | 114 | 99 | EPR | — | — | 11 | — | — | 56 | 1 |
| Com. Ex. 9 | r-PPA | 144.152 | B-PP1X | 54.2 | 114 | 90 | EPR | — | — | 11 | — | — | 56 | 10 |
| Com. Ex. 10 | r-PPA | 144.152 | B-PP1X | 54.2 | 114 | 80 | EPR | — | — | 11 | — | — | 56 | 20 |
| Com. Ex. 11 | r-PPA | 144.152 | B-PP1X | 54.2 | 114 | 70 | EPR | — | — | 11 | — | — | 56 | 30 |
| Ex. 9 | r-PPA | 144.152 | B-PP1X | 54.2 | 114 | 90 | B-PP2X | 1.7 | 15 | — | 72 | 96 | — | 10 |

TABLE 3

|  | Seal strength (N/15 mm width) | Evaluation of degree of aggregation of separation interface | presence or absence of whitening at the time of shaping | Comprehensive evaluation |
|---|---|---|---|---|
| Com. Ex. 1 | 53 | ○ | X | X |
| Com. Ex. 2 | 59 | △ | △ | X |
| Com. Ex. 3 | 44 | △ | X | X |
| Ex. 1 | 47 | ○ | ○ | ○ |
| Ex. 2 | 52 | ○ | ◎ | ◎ |
| Ex. 3 | 52 | ○ | ◎ | ◎ |
| Com. Ex. 4 | 44 | △ | X | X |
| Ex. 4 | 47 | ○ | ○ | ○ |
| Com. Ex. 5 | 44 | △ | X | X |
| Com. Ex. 6 | 45 | △ | ○ | X |
| Ex. 5 | 57 | ○ | ○ | ○ |
| Ex. 6 | 60 | ○ | ◎ | ◎ |
| Ex. 7 | 60 | ○ | ◎ | ◎ |
| Ex. 8 | 58 | ○ | ◎ | ◎ |
| Com. Ex. 7 | 56 | △ | △ | X |
| Com. Ex. 8 | 47 | △ | X | X |
| Com. Ex. 9 | 49 | X | X | X |
| Com. Ex. 10 | 54 | X | X | X |
| Com. Ex. 11 | 56 | X | X | X |
| Ex. 9 | 45 | ○ | ○ | ○ |

Example 10

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 3.5 parts by weight of a first elastomer-modified olefin based resin having a crystallization temperature of 114° C. and a crystallization energy of 54.2 J/g, 3.5 parts by weight of a second elastomer-modified olefin based resin having a crystallization temperature of 96° C. and a crystallization energy of 15 J/g, and 1 parts by weight of ethylene-propylene random copolymer (Tmp: 144° C., 152° C.) at 210° C. Next, a resin composition was obtained by mixing 8 parts by weight of the first melt-kneaded product, 85.5 parts by weight of a first elastomer-modified olefin resin having a crystallization temperature of 114° C. or above and a crystallization energy of 54.2 J/g, and 9.5 parts by weight of a second elastomer-modified olefin based resin having a crystallization temperature of 88° C. or above and a crystallization energy of 14 J/g. A packaging material 1 for a power storage device was obtained in the same manner as in Example 1 except that the second resin layer 8 was constituted by using this resin composition.

Example 11

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 7 parts by weight of a first elastomer-modified olefin based resin having a crystallization temperature of 114° C. and a crystallization energy of 54.2 J/g, 1 parts by weight of a second elastomer-modified olefin based resin having a crystallization temperature of 96° C. and a crystallization energy of 15 J/g, and 2 parts by weight of ethylene-propylene random copolymer (Tmp: 144° C., 152° C.) at 210° C. Next, a resin composition was obtained by mixing 10 parts by weight of the first melt-kneaded product, 72 parts by weight of a first elastomer-modified olefin resin having a crystallization temperature of 114° C. and a crystallization energy of 54.2 J/g, and 18 parts by weight of a second elastomer-modified olefin based resin having a crystallization temperature of 96° C. above and a crystallization energy of 15 J/g. A packaging material 1 for a power storage device was obtained in the same manner as in Example 1 except that the second resin layer 8 was constituted by using this resin composition.

Example 12

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 14 parts by weight of a first elastomer-modified olefin based resin having a crystallization temperature of 114° C. and a crystallization energy of 54.2 J/g, 2 parts by weight of a second elastomer-modified olefin based resin having a crystallization temperature of 96° C. and a crystallization energy of 15 J/g, and 4 parts by weight of ethylene-propylene random copolymer (Tmp: 144° C., 152° C.) at 210° C. Next, a resin composition was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 96° C. and a crystallization energy of 15 J/g. A packaging material 1 for a power storage device was obtained in the same manner as in Example 1 except that the second resin layer 8 was constituted by using this resin composition.

Example 13

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 21 parts by weight of a first elastomer-modified olefin based resin having a crystallization temperature of 114° C. and a crystallization energy of 54.2 J/g, 3 parts by weight of a second elastomer-modified olefin based resin having a crystallization temperature of 96° C. and a crystallization energy of 15 J/g, and 6 parts by weight of ethylene-propylene random copolymer (Tmp: 144° C., 152° C.) at 210° C. Next, a resin composition was obtained by mixing 30 parts by weight of the first melt-kneaded product, and 70 parts by weight of a first elastomer-modified olefin resin having a crystallization temperature of 114° C. and a crystallization energy of 54.2 J/g. A packaging material 1 for a power storage device was obtained in the same manner as in Example 1 except that the second resin layer 8 was constituted by using this resin composition.

Example 14

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 35 parts by weight of a first elastomer-modified olefin based resin having a crystallization temperature of 114° C. and a crystallization energy of 54.2 J/g, 5 parts by weight of a second elastomer-modified olefin based resin having a crystallization temperature of 96° C. and a crystallization energy of 15 J/g, and 10 parts by weight of ethylene-propylene random copolymer (Tmp: 144° C., 152° C.) at 210° C. Next, a resin composition was obtained by mixing 50 parts by weight of the first melt-kneaded product, and 50 parts by weight of a first elastomer-modified olefin resin having a crystallization temperature of 114° C. and a crystallization energy of 54.2 J/g. A packaging material 1 for a power storage device was obtained in the same manner as in Example 1 except that the second resin layer 8 was constituted by using this resin composition.

Example 15

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 21 parts by weight of a first elastomer-modified olefin based resin having a crystallization temperature of 114° C. and a crystallization energy of 54.2 J/g, 3 parts by weight of a second elastomer-modified olefin based resin having a crystallization temperature of 96° C. and a crystallization energy of 15 J/g, and 3 parts by weight of ethylene-propylene random copolymer (Tmp: 144° C., 152° C.) at 210° C. Next, a resin composition was obtained by mixing 30 parts by weight of the first melt-kneaded product, 56 parts by weight of a first elastomer-modified olefin resin having a crystallization temperature of 114° C. and a crystallization energy of 54.2 J/g, and 14 parts by weight of a second elastomer-modified olefin based resin having a crystallization temperature of 96° C. and a crystallization energy of 15 J/g. A packaging material 1 for a power storage device was obtained in the same manner as in Example 1 except that the second resin layer 8 was constituted by using this resin composition.

Example 16

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 8 parts by weight of a first elastomer-modified olefin based resin having a crystallization temperature of 114° C. and a crystallization energy of 54.2 J/g, and 2 parts by weight of a second elastomer-modified olefin based resin having a crystallization temperature of 96° C. and a crystallization energy of 15 J/g at 210° C. Next, a resin composition was obtained by mixing 10 parts by weight of the first melt-kneaded product, 72 parts by weight of a first elastomer-modified olefin resin having a crystallization temperature of 114° C. and a crystallization energy of 54.2 J/g, and 18 parts by weight of a second elastomer-modified olefin based resin having a crystallization temperature of 96° C. above and a crystallization energy of 15 J/g. A packaging material 1 for a power storage device was obtained in the same manner as in Example 1 except that the second resin layer 8 was constituted by using this resin composition.

Example 17

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 14 parts by weight of a first elastomer-modified olefin based resin having a crystallization temperature of 114° C. and a crystallization energy of 54.2 J/g, 2 parts by weight of a second elastomer-modified olefin based resin having a crystallization temperature of 96° C. and a crystallization energy of 15 J/g, and 2 parts by weight of ethylene-propylene random copolymer (Tmp: 144° C., 152° C.) at 210° C. Next, a resin composition was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 96° C. and a crystallization energy of 15 J/g. A packaging material 1 for a power storage device was obtained in the same manner as in Example 1 except that the second resin layer 8 was constituted by using this resin composition.

Example 18

A packaging material 1 for a power storage device structured shown in FIG. 2 was obtained in the same manner as in Example 1, except for using a resin composition obtained as described below as a resin composition constituting the second resin layer 8 and also using ethylene-propylene random copolymer (Tmp: 145° C.) as a resin composition constituting the first resin layer 7. Initially, a first melt-kneaded product was obtained by mixing 16 parts by weight of ethylene-propylene random copolymer (Tmp: 144° C., 152° C.) and 4 parts by weight of ethylene-propylene rubber (EPR) and melt-kneaded at 210° C. Next, a resin composition was obtained by mixing 20 parts by weight of the first melt-kneaded product, 56 parts by weight of a first elastomer-modified olefin resin having a crystallization temperature of 117° C. or above and a crystallization energy of 61.2 J/g, and 24 parts by weight of a second elastomer-modified olefin based resin having a crystallization temperature of 96° C. and a crystallization energy of 15 J/g. Using this resin composition, a second resin layer 8 was constituted.

Example 19

A packaging material 1 for a power storage device structured shown in FIG. 2 was obtained in the same manner as in Example 1, except for using a resin composition obtained as described below as a resin composition constituting the second resin layer 8 and also using ethylene-propylene random copolymer (Tmp: 145° C.) as a resin composition constituting the first resin layer 7. Initially, a first melt-kneaded product was obtained by mixing 14 parts by weight of homopolypropylene and 4 parts by weight of ethylene-1-butene rubber (EBR) and melt-kneading at 210° C. Next, a resin composition was obtained by mixing 20 parts by weight of the first melt-kneaded product, 56 parts by weight of a first elastomer-modified olefin resin having a crystallization temperature of 117° C. or above and a crystallization energy of 61.2 J/g, and 24 parts by weight of a second elastomer-modified olefin based resin having a crystallization temperature of 96° C. and a crystallization energy of 15 J/g. Using this resin composition, a second resin layer 8 was constituted.

Example 20

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 14 parts by weight of a first elastomer-modified olefin based resin having a crystallization temperature of 114° C. and a crystallization energy of 54.2 J/g, and 6 parts by weight of a second elastomer-modified olefin based resin having a crystallization temperature of 96° C. and a crystallization energy of 15 J/g at 210° C. Next, a resin composition was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 96° C. and a crystallization energy of 15 J/g. A packaging material 1 for a power storage device was obtained in the same manner as in Example 1 except that the second resin layer 8 was constituted by using this resin composition.

Example 21

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 14 parts by weight of a first elastomer-modified olefin based resin having a crystallization temperature of 114° C. and a crystallization energy of 54.2 J/g, and 6 parts by weight of ethylene-propylene rubber (EPR) at 210° C. Next, a resin composition was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 96° C. and a crystallization energy of 15 J/g. A packaging material 1 for a power storage device was obtained in the same manner as in Example 1 except that the second resin layer 8 was constituted by using this resin composition.

Example 22

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 14 parts by weight of a first elastomer-modified olefin based resin having a crystallization temperature of 114° C. and a crystallization energy of 54.2 J/g, and 6 parts by weight of styrene-ethylene-butylene-styrene copolymer (SEBS) at 210° C. Next, a resin composition was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 96° C. and a crystallization energy of 15 J/g. A packaging material 1 for a power storage device was obtained in the same manner as in Example 1 except that the second resin layer 8 was constituted by using this resin composition.

Example 23

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 14 parts by weight of ethylene-propylene random copolymer (Tmp: 144° C., 152° C.), and 6 parts by weight of a second elastomer-modified olefin based resin having a crystallization temperature of 96° C. and a crystallization energy of 15 J/g at 210° C. Next, a resin composition was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 96° C. and a crystallization energy of 15 J/g. A packaging material 1 for a power storage device was obtained in the same manner as in Example 1 except that the second resin layer 8 was constituted by using this resin composition.

Example 24

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by mixing 14 parts by weight of ethylene-propylene random copolymer (Tmp: 144° C., 152° C.) and 6 parts by weight of ethylene-1-butene rubber (EBR) and melt-kneaded at 210° C. Next, a resin composition was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 96° C. and a crystallization energy of 15 J/g. A packaging material 1 for a power storage device was obtained in the same manner as in Example 1 except that the second resin layer 8 was constituted by using this resin composition.

Example 25

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by mixing 14 parts by weight of ethylene-propylene random copolymer (Tmp: 144° C., 152°

C.) and 6 parts by weight of styrene-ethylene-butylene-styrene copolymer (SEBS) and melt-kneaded at 210° C. Next, a resin composition was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 96° C. and a crystallization energy of 15 J/g. A packaging material 1 for a power storage device was obtained in the same manner as in Example 1 except that the second resin layer 8 was constituted by using this resin composition.

Example 26

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 14 parts by weight of homopolypropylene, and 6 parts by weight of a second elastomer-modified olefin based resin having a crystallization temperature of 88° C. and a crystallization energy of 14 J/g at 210° C. Next, a resin composition was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 96° C. and a crystallization energy of 15 J/g. A packaging material 1 for a power storage device was obtained in the same manner as in Example 1 except that the second resin layer 8 was constituted by using this resin composition.

Example 27

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by mixing 14 parts by weight of homopolypropylene and 6 parts by weight of ethylene-propylene rubber (EPR) and melt-kneading at 210° C. Next, a resin composition was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 96° C. and a crystallization energy of 15 J/g. A packaging material 1 for a power storage device was obtained in the same manner as in Example 1 except that the second resin layer 8 was constituted by using this resin composition.

Example 28

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by mixing 14 parts by weight of homopolypropylene and 6 parts by weight of styrene-ethylene-butylene-styrene copolymer (SEBS) and melt-kneading at 210° C. Next, a resin composition was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 96° C. and a crystallization energy of 15 J/g. A packaging material 1 for a power storage device was obtained in the same manner as in Example 1 except that the second resin layer 8 was constituted by using this resin composition.

Example 29

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 14 parts by weight of a first elastomer-modified olefin based resin having a crystallization temperature of 114° C. and a crystallization energy of 54.2 J/g, and 6 parts by weight of a second elastomer-modified olefin based resin having a crystallization temperature of 96° C. and a crystallization energy of 15 J/g at 210° C. Next, a resin composition was obtained by mixing 20 parts by weight of the first melt-kneaded product, and 80 parts by weight of a first elastomer-modified olefin resin having a crystallization temperature of 114° C. and a crystallization energy of 54.2 J/g. A packaging material 1 for a power storage device was obtained in the same manner as in Example 1 except that the second resin layer 8 was constituted by using this resin composition.

Example 30

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 14 parts by weight of a first elastomer-modified olefin based resin having a crystallization temperature of 114° C. and a crystallization energy of 54.2 J/g, and 6 parts by weight of ethylene-propylene rubber (EPR) at 210° C. Next, a resin composition was obtained by mixing 20 parts by weight of the first melt-kneaded product, and 80 parts by weight of a first elastomer-modified olefin resin having a crystallization temperature of 114° C. and a crystallization energy of 54.2 J/g. A packaging material 1 for a power storage device was obtained in the same manner as in Example 1 except that the second resin layer 8 was constituted by using this resin composition.

Example 31

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 14 parts by weight of a first elastomer-modified olefin based resin having a crystallization temperature of 114° C. and a crystallization energy of 54.2 J/g, and 6 parts by weight of styrene-ethylene-butylene-styrene copolymer (SEBS) at 210° C. Next, a resin composition was obtained by mixing 20 parts by weight of the first melt-kneaded product, and 80 parts by weight of a first elastomer-modified olefin resin having a crystallization temperature of 114° C. and a crystallization energy of 54.2 J/g. A packaging material 1 for a power storage device was obtained in the same manner as in Example 1 except that the second resin layer 8 was constituted by using this resin composition.

Example 32

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 14 parts by weight of ethylene-propylene random copolymer (Tmp: 144° C., 152° C.), and 6 parts by weight of a second elastomer-modified olefin based resin having a crystallization temperature of 96° C. and a crystallization energy of 15 J/g at 210° C. Next, a resin composition was obtained by mixing 20 parts by weight of the first melt-kneaded product, and 80 parts by weight of a first elastomer-modified olefin resin having a crystallization temperature of 114° C. and a crystallization energy of 54.2 J/g. A packaging material 1 for a power storage device was obtained in the same manner as in Example 1 except that the second resin layer 8 was constituted by using this resin composition.

Example 33

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by mixing 14 parts by weight of ethylene-propylene random copolymer (Tmp: 144° C., 152° C.) and 6 parts by weight of ethylene-1-butene rubber (EBR) and melt-kneaded at 210° C. Next, a resin composition was obtained by mixing 20 parts by weight of the first melt-kneaded product, and 80 parts by weight of a first elastomer-modified olefin resin having a crystallization temperature of 114° C. and a crystallization energy of 54.2 J/g. A packaging material 1 for a power storage device was obtained in the same manner as in Example 1 except that the second resin layer 8 was constituted by using this resin composition.

Example 34

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by mixing 14 parts by weight of ethylene-propylene random copolymer (Tmp: 144° C., 152° C.) and 6 parts by weight of styrene-ethylene-butylene-styrene copolymer (SEBS) and melt-kneaded at 210° C. Next, a resin composition was obtained by mixing 20 parts by weight of the first melt-kneaded product, and 80 parts by weight of a first elastomer-modified olefin resin having a crystallization temperature of 114° C. and a crystallization energy of 54.2 J/g. A packaging material 1 for a power storage device was obtained in the same manner as in Example 1 except that the second resin layer 8 was constituted by using this resin composition.

Example 35

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by melt-kneading 14 parts by weight of homopolypropylene, and 6 parts by weight of a second elastomer-modified olefin based resin having a crystallization temperature of 88° C. and a crystallization energy of 14 J/g at 210° C. Next, a resin composition was obtained by mixing 20 parts by weight of the first melt-kneaded product, and 80 parts by weight of a first elastomer-modified olefin resin having a crystallization temperature of 114° C. and a crystallization energy of 54.2 J/g. A packaging material 1 for a power storage device was obtained in the same manner as in Example 1 except that the second resin layer 8 was constituted by using this resin composition.

Example 36

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by mixing 14 parts by weight of homopolypropylene and 6 parts by weight of ethylene-propylene rubber (EPR) and melt-kneading at 210° C. Next, a resin composition was obtained by mixing 20 parts by weight of the first melt-kneaded product, and 80 parts by weight of a first elastomer-modified olefin resin having a crystallization temperature of 114° C. and a crystallization energy of 54.2 J/g. A packaging material 1 for a power storage device was obtained in the same manner as in Example 1 except that the second resin layer 8 was constituted by using this resin composition.

Example 37

A packaging material 1 for a power storage device structured shown in FIG. 2 was obtained in the same manner as in Example 1, except for using, as a resin composition constituting the second resin layer 8, a resin composition obtained as described below. Initially, a first melt-kneaded product was obtained by mixing 14 parts by weight of homopolypropylene and 6 parts by weight of styrene-ethylene-butylene-styrene copolymer (SEBS) and melt-kneading at 210° C. Next, a resin composition was obtained by mixing 20 parts by weight of the first melt-kneaded product, and 80 parts by weight of a first elastomer-modified olefin resin having a crystallization temperature of 114° C. and a crystallization energy of 54.2 J/g. A packaging material 1 for a power storage device was obtained in the same manner as in Example 1 except that the second resin layer 8 was constituted by using this resin composition.

Comparative Example 12

A packaging material for a power storage device was obtained in the same manner as in Example 12 except for using, as a resin constituting the first resin layer 7, a first elastomer-modified olefin based resin having a crystallization temperature of 114° C. and a crystallization energy of 54.2 J/g in place of ethylene-propylene random copolymer.

Comparative Example 13

A packaging material 1 for a power storage device structured shown in FIG. 2 was obtained in the same manner as in Example 12, except for using, as a resin composition constituting the second resin layer 8, a resin composition obtained as described below. Initially, a first melt-kneaded product was obtained by melt-kneading 14 parts by weight of a first elastomer-modified olefin based resin having a crystallization temperature of 114° C. and a crystallization energy of 54.2 J/g, 2 parts by weight of a second elastomer-modified olefin based resin having a crystallization temperature of 96° C. and a crystallization energy of 15 J/g, and 4 parts by weight of ethylene-propylene random copolymer (Tmp: 144° C., 152° C.) at 210° C. Next, a resin composition was obtained by mixing 20 parts by weight of the first melt-kneaded product, and 80 parts by weight of a second elastomer-modified olefin resin having a crystallization temperature of 96° C. and a crystallization energy of 15 J/g. A packaging material 1 for a power storage device was obtained in the same manner as in Example 12 except that the second resin layer 8 was constituted by using this resin composition.

Comparative Example 14

A packaging material 1 for a power storage device structured shown in FIG. 2 was obtained in the same manner as in Example 12, except for using, as a resin composition constituting the second resin layer 8, a resin composition obtained as described below. Initially, a first melt-kneaded product was obtained by melt-kneading 14 parts by weight of a first elastomer-modified olefin based resin having a crystallization temperature of 114° C. and a crystallization energy of 54.2 J/g, 2 parts by weight of a second elastomer-modified olefin based resin having a crystallization temperature of 96° C. and a crystallization energy of 15 J/g, and 4 parts by weight of ethylene-propylene random copolymer (Tmp: 144° C., 152° C.) at 210° C. Next, a resin composition was obtained by mixing 20 parts by weight of the first melt-kneaded product, 64 parts by weight of a first elastomer-modified olefin resin having a crystallization temperature of 96° C. and a crystallization energy of 53.0 J/g, and 16 parts by weight of a second elastomer-modified olefin based resin having a crystallization temperature of 96° C. and a crystallization energy of 15 J/g. A packaging material 1 for a power storage device was obtained in the same manner as in Example 12 except that the second resin layer 8 was constituted by using this resin composition.

Comparative Example 15

A packaging material 1 for a power storage device structured shown in FIG. 2 was obtained in the same manner as in Example 12, except for using, as a resin composition constituting the second resin layer 8, a resin composition obtained as described below. Initially, a first melt-kneaded product was obtained by melt-kneading 14 parts by weight of a first elastomer-modified olefin based resin having a crystallization temperature of 114° C. and a crystallization energy of 54.2 J/g, 2 parts by weight of a second elastomer-modified olefin based resin having a crystallization temperature of 96° C. and a crystallization energy of 15 J/g, and 4 parts by weight of ethylene-propylene random copolymer (Tmp: 144° C., 152° C.) at 210° C. Next, a resin composition was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 83° C. and a crystallization energy of 10 J/g. A packaging material 1 for a power storage device was obtained in the same manner as in Example 12 except that the second resin layer 8 was constituted by using this resin composition.

Comparative Example 16

A packaging material 1 for a power storage device structured shown in FIG. 2 was obtained in the same manner as in Example 12, except for using, as a resin composition constituting the second resin layer 8, a resin composition obtained as described below. Initially, a first melt-kneaded product was obtained by melt-kneading 14 parts by weight of a first elastomer-modified olefin based resin having a crystallization temperature of 114° C. and a crystallization energy of 54.2 J/g, 2 parts by weight of a second elastomer-modified olefin based resin having a crystallization temperature of 96° C. and a crystallization energy of 15 J/g, and 4 parts by weight of ethylene-propylene random copolymer (Tmp: 144° C., 152° C.) at 210° C. Next, a resin composition was obtained by mixing 20 parts by weight of the first melt-kneaded product, 64 parts by weight of a first elastomer-modified olefin resin having a crystallization temperature of 106° C. and a crystallization energy of 45.5 J/g, and 16 parts by weight of a second elastomer-modified olefin based resin having a crystallization temperature of 96° C. and a crystallization energy of 15 J/g. A packaging material 1 for a power storage device was obtained in the same manner as in Example 12 except that the second resin layer 8 was constituted by using this resin composition.

Comparative Example 17

A packaging material 1 for a power storage device structured shown in FIG. 2 was obtained in the same manner as in Example 12, except for using, as a resin composition constituting the second resin layer 8, a resin composition obtained as described below. Initially, a first melt-kneaded product was obtained by melt-kneading 14 parts by weight of a first elastomer-modified olefin based resin having a crystallization temperature of 114° C. and a crystallization energy of 54.2 J/g, 2 parts by weight of a second elastomer-modified olefin based resin having a crystallization temperature of 96° C. and a crystallization energy of 15 J/g, and 4 parts by weight of ethylene-propylene random copolymer (Tmp: 144° C., 152° C.) at 210° C. Next, a resin composition was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 108° C. and a crystallization energy of 40 J/g. A packaging material 1 for a power storage device was obtained in the same manner as in Example 12 except that the second resin layer 8 was constituted by using this resin composition.

Example 38

On both surfaces of an aluminum foil 4 having a thickness of 35 μm, a chemical conversion treatment solution including phosphoric acid, polyacrylic acid (acrylic based resin), chromium (III) salt compound, water, and alcohol was applied, and then dried at 180° C. to form a chemical conversion film. The chromium deposition amount of this chemical conversion film was 10 mg/m² per one surface.

Next, on one surface of the chemical conversion treated aluminum foil 4, a biaxially stretched 6 nylon film 2 having a thickness of 15 μm wad dry laminated (bonded) via a two-part curing type urethane based adhesive 5.

Next, a first melt-kneaded product was obtained by melt-kneading 14 parts by weight of a first elastomer-modified olefin based resin having a crystallization temperature of 114° C. and a crystallization energy of 54.2 J/g, 2 parts by weight of a second elastomer-modified olefin based resin having a crystallization temperature of 96° C. and a crystallization energy of 15 J/g, and 4 parts by weight of ethylene-propylene random copolymer (Tmp: 144° C., 152° C.) at 210° C. Next, a resin composition for a second resin layer was obtained by mixing 20 parts by weight of the first melt-kneaded product, 64 parts by weight of a first elastomer-modified olefin resin having a crystallization temperature of 114° C. and a crystallization energy of 54.2 J/g, and 16 parts by weight of a second elastomer-modified olefin based resin having a crystallization temperature of 96° C. and a crystallization energy of 15 J/g.

Next, a first resin layer 7 having a thickness of 8 μm and made of an ethylene-propylene random copolymer and a second resin layer 8 having a thickness of 22 μm (second resin layer 8 made of a resin composition for the second resin layer) were co-extruded so that these layers are laminated using a T die to obtain a sealant film 3 having a thickness of 30 μm in which these two layers were laminated (first resin layer 7/second resin layer 8) were obtained. Thereafter, one of surfaces of the first resin layer 7 of the sealant film 3 was overlapped on the other surface of the dry laminated aluminum foil 4 by a two-part curing type maleic acid-modified polypropylene adhesive agent 6, and pinched by and between a rubber nip roll and a lamination roll heated to 100° C. to be press-bonded and dry laminated. Thereafter, by performing aging (heating) at 50° C. for 5 days, a packaging material 1 for a power storage device having a structure shown in FIG. 1 was obtained.

As the two-part curing type maleic acid-modified polypropylene adhesive agent, using an adhesive agent solution in which 100 parts by weight of maleic acid-modified polypropylene (melting point 80° C., acid value 10 mgKOH/g) as a base resin, 8 parts by weight of hexamethylene diisocyanate isocyanurate (NCO content rate: 20 mass %) as a curing agent, and further a solvent were mixed, the adhesive agent solution was applied on the other surface of the aluminum foil 4 so that the solid content applied amount became 2 g/m², and heated and dried, and then overlapped on one of surfaces of the first resin layer 7 of the sealant film 3.

In Examples 10 to 38 and Comparative Examples 12 to 17, melt-kneading was performed by using a 40φ extruder (L/D=24) equipped with a screw with tip Dulmage and a strand forming die at 210° C., and the formed strand was water-cooled and solidified in a water tank and cut with a cutter. Thus, a pellet (granular shape having a major axis of 4 mm to 5 mm) of a first melt-kneaded product was obtained.

TABLE 4

| | First resin layer | | First elastomer-modified olefin based resin | | | | Second elastomer-modified olefin based resin | | | | | | | First melt-kneaded product |
|---|---|---|---|---|---|---|---|---|---|---|---|---|---|---|
| | Type | Tmp (° C.) | Type | ΔHc (J/g) | Tcp (° C.) | Mixed amount (parts by weight) | Type | ΔHc1 (J/g) | ΔHc2 (J/g) | ΔHc (J/g) | Tcp1 (° C.) | Tcp2 (° C.) | Tcp (° C.) | Mixed amount (parts by weight) | Type (parts by weight) |
| Ex. 10 | r-PPA | 144.152 | B-PP1X | 54.2 | 114 | 85.5 | B-PP2Y | — | — | 14 | — | — | 88 | 9.5 | B-PP1X(3.5)/B-PP2X(3.5)/r-PPA(1) |
| Ex. 11 | r-PPA | 144.152 | B-PP1X | 54.2 | 114 | 72 | B-PP2X | 1.7 | 15 | — | 72 | 96 | — | 18 | B-PP1X(7)/B-PP2X(1)/r-PPA(2) |
| Ex. 12 | r-PPA | 144.152 | B-PP1X | 54.2 | 114 | 64 | B-PP2X | 1.7 | 15 | — | 72 | 96 | — | 16 | B-PP1X(14)/B-PP2X(2)/r-PPA(4) |
| Ex. 13 | r-PPA | 144.152 | B-PP1X | 54.2 | 114 | 70 | — | — | — | — | — | — | — | — | B-PP1X(21)/B-PP2X(3)/r-PPA(6) |
| Ex. 14 | r-PPA | 144.152 | B-PP1X | 54.2 | 114 | 50 | — | — | — | — | — | — | — | — | B-PP1X(35)/B-PP2X(5)/r-PPA(10) |
| Ex. 15 | r-PPA | 144.152 | B-PP1X | 54.2 | 114 | 56 | B-PP2X | 1.7 | 15 | — | 72 | 96 | 144 | 14 | B-PP1X(21)/B-PP2X(3)/r-PPA(3)/homePP(3) |
| Ex. 16 | r-PPA | 144.152 | B-PP1X | 54.2 | 114 | 72 | B-PP2X | 1.7 | 15 | — | 72 | 96 | 144 | 18 | B-PP1X(8)/B-PP2X(2) |
| Ex. 17 | r-PPA | 144.152 | B-PP1X | 54.2 | 114 | 64 | B-PP2X | 1.7 | 15 | — | 72 | 96 | 144 | 16 | B-PP1X(14)/B-PP2X(2)/r-PPA(2)/EPR(2) |
| Ex. 18 | r-PPB | 145 | B-PP1Y | 61.2 | 117 | 56 | B-PP2X | 1.7 | 15 | — | 72 | 96 | 144 | 24 | r-PPA(16)/EPR(4) |
| Ex. 19 | r-PPB | 145 | B-PP1Y | 61.2 | 117 | 56 | B-PP2X | 1.7 | 15 | — | 72 | 96 | 144 | 24 | HomoPP(14)/EBR(6) |

TABLE 5

| | First resin layer | | Second resin layer | | | | | | | | | | | |
|---|---|---|---|---|---|---|---|---|---|---|---|---|---|---|
| | | | First elastomer-modified olefin based resin | | | | Second elastomer-modified olefin based resin | | | | | | | First melt-kneaded product |
| | | | | | | Mixed amount (parts | | | | | | | Mixed amount (parts | |
| | Type | Tmp (° C.) | Type | ΔHc (J/g) | Tcp (° C.) | by weight) | Type | ΔHc1 (J/g) | ΔHc2 (J/g) | ΔHc (J/g) | Tcp1 (° C.) | Tcp2 (° C.) | Tcp (° C.) | by weight) | Type (parts by weight) |
| Ex. 20 | r-PPA | 144.152 | B-PP1X | 54.2 | 114 | 64 | B-PP2X | 1.7 | 15 | — | 72 | 96 | — | 16 | B-PP1X(14)/B-PP2X(6) |
| Ex. 21 | r-PPA | 144.152 | B-PP1X | 54.2 | 114 | 64 | B-PP2X | 1.7 | 15 | — | 72 | 96 | — | 16 | B-PP1X(14)/EPR(6) |
| Ex. 22 | r-PPA | 144.152 | B-PP1X | 54.2 | 114 | 64 | B-PP2X | 1.7 | 15 | — | 72 | 96 | — | 16 | B-PP1X(14)/SEBS(6) |
| Ex. 23 | r-PPA | 144.152 | B-PP1X | 54.2 | 114 | 64 | B-PP2X | 1.7 | 15 | — | 72 | 96 | — | 16 | r-PPA(14)/B-PP2X(6) |
| Ex. 24 | r-PPA | 144.152 | B-PP1X | 54.2 | 114 | 64 | B-PP2X | 1.7 | 15 | — | 72 | 96 | — | 16 | r-PPA(14)/EBR(6) |
| Ex. 25 | r-PPA | 144.152 | B-PP1X | 54.2 | 114 | 64 | B-PP2X | 1.7 | 15 | — | 72 | 96 | — | 16 | r-PPA(14)/SEBS(6) |
| Ex. 26 | r-PPA | 144.152 | B-PP1X | 54.2 | 114 | 64 | B-PP2X | 1.7 | 15 | — | 72 | 96 | — | 16 | HomoPP(14)/B-PP2Y(6) |
| Ex. 27 | r-PPA | 144.152 | B-PP1X | 54.2 | 114 | 64 | B-PP2X | 1.7 | 15 | — | 72 | 96 | — | 16 | HomoPP(14)/EPR(6) |
| Ex. 28 | r-PPA | 144.152 | B-PP1X | 54.2 | 114 | 64 | B-PP2X | 1.7 | 15 | — | 72 | 96 | — | 16 | HomoPP(14)/SEBS(6) |
| Ex. 38 | r-PPA | 144.152 | B-PP1X | 54.2 | 114 | 64 | B-PP2X | 1.7 | 15 | — | 72 | 96 | — | 16 | B-PP1X(14)/B-PP2X(2)/r-PPA(4) |

TABLE 6

| | First resin layer | | Second resin layer | | | | | | | First melt-kneaded product |
|---|---|---|---|---|---|---|---|---|---|---|
| | | | First elastomer-modified olefin based resin | | | | Second elastomer-modified olefin based resin | | | |
| | | | | | | Mixed amount (parts | | | Mixed amount (parts | |
| | Type | Tmp (° C.) | Type | ΔHc (J/g) | Tcp (° C.) | by weight) | Type | ΔHc (J/g) | Tcp (° C.) | by weight) | Type (parts by weight) |
| Ex. 29 | r-PPA | 144.152 | B-PP1X | 54.2 | 114 | 80 | — | — | — | — | B-PP1X(14)/B-PP2X(6) |
| Ex. 30 | r-PPA | 144.152 | B-PP1X | 54.2 | 114 | 80 | — | — | — | — | B-PP1X(14)/EPR(6) |
| Ex. 31 | r-PPA | 144.152 | B-PP1X | 54.2 | 114 | 80 | — | — | — | — | B-PP1X(14)/SEBS(6) |
| Ex. 32 | r-PPA | 144.152 | B-PP1X | 54.2 | 114 | 80 | — | — | — | — | r-PPA(14)/B-PP2X(6) |
| Ex. 33 | r-PPA | 144.152 | B-PP1X | 54.2 | 114 | 80 | — | — | — | — | r-PPA(14)/EBR(6) |
| Ex. 34 | r-PPA | 144.152 | B-PP1X | 54.2 | 114 | 80 | — | — | — | — | r-PPA(14)/SEBS(6) |
| Ex. 35 | r-PPA | 144.152 | B-PP1X | 54.2 | 114 | 80 | — | — | — | — | HomoPP(14)/BPP2Y(6) |
| Ex. 36 | r-PPA | 144.152 | B-PP1X | 54.2 | 114 | 80 | — | — | — | — | HomoPP(14)/EPR(6) |
| Ex. 37 | r-PPA | 144.152 | B-PP1X | 54.2 | 114 | 80 | — | — | — | — | HomoPP(14)/SEBS(6) |

TABLE 7

| | First resin layer | | Second resin layer | | | | | | | | | | | First melt-kneaded product |
|---|---|---|---|---|---|---|---|---|---|---|---|---|---|---|
| | | | First elastomer-modified olefin based resin | | | | Second elastomer-modified olefin based resin | | | | | | | |
| | | | | | | Mixed amount (parts | | | | | | | Mixed amount (parts | |
| | Type | Tmp (° C.) | Type | ΔHc (J/g) | Tcp (° C.) | by weight) | Type | ΔHc1 (J/g) | ΔHc2 (J/g) | ΔHc (J/g) | Tcp1 (° C.) | Tcp2 (° C.) | Tcp (° C.) | by weight) | Type (parts by weight) |
| Com. Ex. 12 | B-PP1X | — | B-PP1X | 54.2 | 114 | 64 | B-PP2X | 1.7 | 15 | — | 72 | 96 | — | 16 | B-PP1X(14)/B-PP2X(2)/r-PPA(4) |
| Com. Ex. 13 | r-PPA | 144.152 | — | — | — | — | B-PP2X | 1.7 | 15 | — | 72 | 96 | — | 80 | B-PP1X(14)/B-PP2X(2)/r-PPA(4) |
| Com. Ex. 14 | r-PPA | 144.152 | B-PP1V | 53.0 | 96 | 64 | B-PP2X | 1.7 | 15 | — | 72 | 96 | — | 16 | B-PP1X(14)/B-PP2X(2)/r-PPA(4) |
| Com. Ex. 15 | r-PPA | 144.152 | B-PP1X | 54.2 | 114 | 64 | B-PP2Z | — | — | 10 | — | — | 83 | 16 | B-PP1X(14)/B-PP2X(2)/r-PPA(4) |

TABLE 7-continued

| | | | Second resin layer | | | | | | | | | | | |
|---|---|---|---|---|---|---|---|---|---|---|---|---|---|---|
| | First resin layer | | First elastomer-modified olefin based resin | | | | Second elastomer-modified olefin based resin | | | | | | | First melt-kneaded product |
| | Type | Tmp (° C.) | Type | ΔHc (J/g) | Tcp (° C.) | Mixed amount (parts by weight) | Type | ΔHc1 (J/g) | ΔHc2 (J/g) | ΔHc (J/g) | Tcp1 (° C.) | Tcp2 (° C.) | Tcp (° C.) | Mixed amount (parts by weight) | Type (parts by weight) |
| Com. Ex. 16 | r-PPA | 144.152 | B-PP1W | 45.5 | 106 | 64 | B-PP2X | 1.7 | 15 | — | 72 | 96 | — | 16 | B-PP1X(14)/B-PP2X(2)/r-PPA(4) |
| Com. Ex. 17 | r-PPA | 144.152 | B-PP1X | 54.2 | 114 | 64 | B-PP2V | — | — | 40 | — | — | 108 | 16 | B-PP1X(14)/B-PP2X(2)/r-PPA(4) |

TABLE 8

| | Seal strength (N/15 mm width) | Evaluation of cohesion degree at separation interface | Presence or absence of whitening at the time of shaping | Comprehensive evaluation |
|---|---|---|---|---|
| Ex. 10 | 56 | ⊚ | ⊚ | ⊚ |
| Ex. 11 | 54 | ⊚ | ⊚ | ⊚ |
| Ex. 12 | 56 | ⊚ | ⊚ | ⊚ |
| Ex. 13 | 61 | ⊚ | ⊚ | ⊚ |
| Ex. 14 | 61 | ⊚ | ⊚ | ⊚ |
| Ex. 15 | 54 | ⊚ | ⊚ | ⊚ |
| Ex. 16 | 55 | ⊚ | ⊚ | ⊚ |
| Ex. 17 | 51 | ⊚ | ⊚ | ⊚ |
| Ex. 18 | 56 | ⊚ | ⊚ | ⊚ |
| Ex. 19 | 54 | ⊚ | ⊚ | ⊚ |
| Ex. 20 | 54 | ⊚ | ⊚ | ⊚ |
| Ex. 21 | 51 | ⊚ | ⊚ | ⊚ |
| Ex. 22 | 44 | ⊚ | ○ | ⊚ |
| Ex. 23 | 49 | ⊚ | ⊚ | ⊚ |
| Ex. 24 | 51 | ⊚ | ⊚ | ⊚ |
| Ex. 25 | 46 | ⊚ | ○ | ⊚ |
| Ex. 26 | 51 | ⊚ | ⊚ | ⊚ |
| Ex. 27 | 50 | ⊚ | ⊚ | ⊚ |
| Ex. 28 | 46 | ⊚ | ○ | ⊚ |

TABLE 9

| | Seal strength (N/15 mm width) | Evaluation of cohesion degree at separation interface | Presence or absence of whitening at the time of shaping | Comprehensive evaluation |
|---|---|---|---|---|
| Ex. 29 | 51 | ⊚ | ⊚ | ⊚ |
| Ex. 30 | 51 | ⊚ | ⊚ | ⊚ |
| Ex. 31 | 46 | ⊚ | ○ | ⊚ |
| Ex. 32 | 50 | ⊚ | ⊚ | ⊚ |
| Ex. 33 | 49 | ⊚ | ⊚ | ⊚ |
| Ex. 34 | 46 | ⊚ | ○ | ⊚ |
| Ex. 35 | 45 | ⊚ | ⊚ | ⊚ |
| Ex. 36 | 51 | ⊚ | ⊚ | ⊚ |
| Ex. 37 | 44 | ⊚ | ○ | ⊚ |
| Ex. 38 | 56 | ⊚ | ⊚ | ⊚ |
| Com. Ex. 12 | 53 | ○ | △ | X |
| Com. Ex. 13 | 56 | △ | △ | X |
| Com. Ex. 14 | 44 | ○ | △ | X |
| Com. Ex. 15 | 46 | △ | △ | X |
| Com. Ex. 16 | 45 | △ | ○ | X |
| Com. Ex. 17 | 55 | ○ | △ | X |

In Examples 1 to 9 and Comparative Examples 1 to 11, the first elastomer-modified olefin based resin was made of EPR-modified homopolypropylene and an EPR-modified product of ethylene-propylene random copolymer, and the second elastomer-modified olefin based resin was made of EPR-modified homopolypropylene and an EPR-modified product of ethylene-propylene random copolymer. The EPR denotes ethylene-propylene rubber.

Further, in Examples 10 to 38 and Comparative Examples 12 to 17, the first elastomer-modified olefin based resin was made of EPR-modified homopolypropylene and an EPR-modified product of ethylene-propylene random copolymer, and the second elastomer-modified olefin based resin was made of EPR-modified homopolypropylene and an EPR-modified product of ethylene-propylene random copolymer. The EPR denotes ethylene-propylene rubber.

In Tables 1 to 7, the following abbreviations showing first and second elastomer-modified olefin based resins denote the following resins.

"B-PP1X"—first elastomer-modified olefin based resin having a crystallization temperature (Tcp) of 114° C. and a crystallization energy (ΔHc) of 54.2 J/g "B-PP1Y"—first elastomer-modified olefin based resin having a crystallization temperature (Tcp) of 117° C. and a crystallization energy (ΔHc) of 61.2 J/g "B-PP1Z"—first elastomer-modified olefin based resin having a crystallization temperature (Tcp) of 106° C. and a crystallization energy (ΔHc) of 54.0 J/g "B-PP1V"—first elastomer-modified olefin based resin having a crystallization temperature (Tcp) of 96° C. and a crystallization energy (ΔHc) of 53.0 J/g "B-PP1W"—first elastomer-modified olefin based resin having a crystallization temperature (Tcp) of 106° C. and a crystallization energy (ΔHc) of 45.5 J/g "B-PP2X"—second elastomer-modified olefin based resin having a crystallization temperature (Tcp) of 96° C. and a crystallization energy (ΔHc) of 15 J/g "B-PP2Y"—second elastomer-modified olefin based resin having a crystallization temperature (Tcp) of 88° C. and a crystallization energy (ΔHc) of 14 J/g "B-PP2Z"—second elastomer-modified olefin based resin having a crystallization temperature (Tcp) of 83° C. and a crystallization energy (ΔHc) of 10 J/g "B-PP2V"—second elastomer-modified olefin based resin having a crystallization temperature (Tcp) of 108° C. and a crystallization energy (ΔHc) of 40 J/g Further, in Tables, the following abbreviations denote the following resins, respectively.

"EPR"—ethylene-propylene rubber
"EBR"—ethylene-1-butene rubber
"SEBS"—styrene-ethylene-butylene-styrene copolymer
"homo PP"—homopolypropylene
"r-PPA"—ethylene-propylene random copolymer (melting point Tmp: 144° C., 152° C.)

"r-PPB"—ethylene-propylene random copolymer (melting point Tmp: 145° C.).

The "crystallization temperature" of each of the aforementioned resins was a crystallization peak temperature (Tcp) measured by differential scanning calorimetry (DSC) in accordance with JIS K7121-1987. Further, the "crystallization energy" of each of the aforementioned resins was a crystallization energy (ΔHc) measured by differential scanning calorimetry (DSC) in accordance with JIS K7122-1987. Both of them were measured by the following Measurement conditions.

Temperature raising and lowering speed: temperature raising and lowering rate at 10° C./min between 23° C. to 210° C.

Sample amount: 5 mg was metered

Container: aluminum pan was used

Apparatus: "DSC-60A" manufactured by Shimadzu Corporation

With regard to "crystallization energy", when there exists only one crystallization peak, "crystallization energy" is shown as "ΔHc", and when there exist two crystallization peaks, "crystallization energy" of the crystallization peak lower in temperature is shown as "ΔHc1". The "crystallization energy" of the crystallization peak higher in temperature is shown as "ΔHc2".

Further, with regard to "crystallization temperature", when there exists only one crystallization peak, "crystallization temperature" is shown as "Tcp", and when there exist two crystallization peaks, "crystallization temperature" lower in temperature is shown as "Tcp1". The "crystallization temperature" higher in temperature is shown as "Tcp2".

As to each packaging material for a power storage device obtained as described above, based on the following measurement method and evaluation method, the seal strength was measured, the cohesion degree of the separation interface when separated was evaluated, and the presence or absence of whitening at the time of shaping was evaluated.

<Seal Strength Measurement Method>

From the obtained packaging material, two test pieces each having a width of 15 mm and a length of 150 mm were cut. Thereafter, these test pieces were heat sealed by single-sided heating under the conditions of heat seal temperature: 200° C., sealing pressure: 0.2 MPa (gauge display pressure), and sealing time: 2 seconds using a heat sealing device (TP-701-A) manufactured by Tester Sangyo Co., Ltd. in a state in which the two test pieces are overlapped with the inner sealant layers and in contact with each other.

Next, as to a pair of packaging materials with the inner sealant layers heat-sealed joined as described above, using a Strograph (AGS-5kNX) manufactured by Shimadzu Corporation in accordance with JIS Z0238-1998, the separation strength when the packaging materials (test pieces) were separated at the sealed portions of the inner sealant layers by 90 degrees at a tensile rate of 100 mm/min was measured, and set as the seal strength (N/15 mm width).

When this seal strength was 30 N/15 mm width or more, it was evaluated as "Pass". It is preferable that the seal strength is 40 N/15 mm width or more.

<Evaluation Method of Cohesion Degree of Separation Interface>

Both surfaces of the separated portions (broken portions) of the inner sealant layers of the packaging material that the seal strength (separation strength) was measured were visually observed, the presence or absence or degree (it can be judged that the stronger the whitening is, the larger the cohesion degree) of whitening of both surfaces of the separated portion (broken portion) was evaluated based on the following Judgment criteria.

(Judgment Criteria)

It was denoted as "X" when whitening was not recognized or there was almost no whitening and the cohesion degree was low.

It was denoted as "Δ" when whitening was generated to some extent and the cohesion degree was medium.

It was denoted as "◯" when whitening was generated markedly and the cohesion degree was large.

It was denoted as "⊙" when whitening was generated further markedly and the cohesion degree was further large.

<Evaluation Method of the Presence or Absence of Whitening at the Time of Shaping>

Using a deep drawing tool manufactured by Amada Co., Ltd., the packaging material was deep drawn into a rectangular shape having a depth of 5 mm under the following shaping condition. Thereafter, the inner side surface (three inner sealant layer surfaces) of the accommodation recess of the obtained formed product was visually observed and the presence or absence or the degree of whitening was evaluated based on the following judgment criteria.

(Judgment Criteria)

The formed product after the shaping was visually observed, and it was evaluated as "⊙" when no whitening was recognized or almost not recognized, "◯" when there was less whitening, and "Δ" when whitening was generated to some extent, and "X" when whitening was generated markedly.

(Shaping Condition)

shaping die—punch: 33.3 mm×53.9 mm, die: 80 mm×120 mm, corner R: 2 mm, punch R: 1.3 mm, die R: 1 mm wrinkle pressing pressure—gauge pressure: 0.475 MPa, actual pressure (calculated value): 0.7 MPa material—SC (carbon steel) material, only punch R was chrome-plated <Comprehensive Evaluation>

By comprehensively determining, the aforementioned three evaluation results were evaluated in four stages, when the comprehensive evaluation was especially excellent, it was evaluated as "⊙", when the comprehensive evaluation was excellent, it was evaluated as "◯", when the comprehensive evaluation was somewhat poor, it was evaluated as "Δ", and when the comprehensive evaluation was poor, it was evaluated as "X".

Apparent from Table, the packaging material for a power storage device (packaging material for a power storage device using the sealant film of the present invention) of Examples 1 to 9 of the present invention had adequate seal strength and the degree of whitening at the separation interface was large. Therefore, the cohesion degree of the separation interface was high and cohesive failure was generated inside of the sealant layer at the time of separation, and further whitening at the time of shaping was also suppressed. As described above, in the case of using a packaging material for a power storage device of Examples 1 to 9 of the present invention, cohesive failure was generated inside the sealant layer. Therefore, separation unlikely occurs at the interface of the metal foil layer 4 and the inner sealant layer 3 at the time of separation (breakage). Thus, when a separation point (broken point) for bursting prevention occurs, there is a merit that a breakage continuing from the separation point (broken point) as a starting point unlikely progresses.

On the other hand, in Comparative Examples 1 to 11 deviated from the defined range of claims of the present invention, all of the comprehensive evaluations were "X".

Apparent from Table, the packaging material for a power storage device (packaging material for a power storage device using the sealant film of the present invention) of Examples 10 to 38 of the present invention had adequate seal strength and the degree of whitening at the separation interface was adequately large. Therefore, the cohesion degree of the separation interface was high and cohesive failure was generated inside of the sealant layer at the time of separation, and further whitening at the time of shaping was also adequately suppressed. As described above, in the case of using a packaging material for a power storage device of Examples 10 to 38 of the present invention, cohesive failure was generated inside the sealant layer. Therefore, separation unlikely occurs at the interface of the metal foil layer 4 and the inner sealant layer 3 at the time of separation (breakage). Thus, when a separation point (broken point) for bursting prevention occurs, there is a merit that a breakage continuing from the separation point (broken point) as a starting point unlikely progresses.

On the other hand, in Comparative Examples 12 to 17 deviated from the defined range of claims of the present invention, all of the comprehensive evaluations were "X".

INDUSTRIAL APPLICABILITY

The sealant film for a packaging material of a power storage device according to the present invention can be used as a sealant film for a packaging material of a power storage device, such as, e.g., mobile storage batteries, automotive storage batteries, regenerative energy recovering storage batteries, condensers (capacitors), and all-solid-state batteries.

The packaging material for a power storage device according to the present invention can be used as a packaging material for, e.g., mobile storage batteries, automotive storage batteries, regenerative energy recovering storage batteries, condensers (capacitors), and all-solid-state batteries.

The power storage device according to the present invention can be used as mobile storage batteries, automotive storage batteries, regenerative energy recovering storage batteries, condensers (capacitors), and all-solid-state batteries.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

DESCRIPTION OF THE SYMBOLS

1 packaging material for a power storage device
2 base material layer (outer layer)
3 inner sealant layer (sealant film)
4 metal foil layer
7 first resin layer
8 second resin layer
10 packaging case for a power storage device (shaped product)
15 packaging member
30 power storage device
31 power storage device main body

The invention claimed is:

1. A sealant film for a packaging material of a power storage device, comprising:
   a laminated body of two or more layers,
   wherein the laminated body includes
   a first resin layer containing 50 mass % or more of a random copolymer containing propylene and another copolymer component other than propylene as copolymer components,
   a second resin layer formed by a mixed resin containing a first elastomer-modified olefin based resin having a crystallization temperature of 105° C. or higher and a crystallization energy of 50 J/g or more, and a second elastomer-modified olefin based resin having a crystallization temperature is 85° C. or higher and a crystallization energy of 30 J/g or less,
   wherein the first elastomer-modified olefin based resin is made of elastomer-modified homopolypropylene and/or elastomer-modified random copolymer,
   wherein the second elastomer-modified olefin based resin is made of elastomer-modified homopolypropylene and/or elastomer-modified random copolymer,
   wherein the elastomer-modified random copolymer is an elastomer-modified product of a random copolymer containing propylene and another copolymer component other than propylene as copolymer components, and
   wherein in the second resin layer, a total value of a content rate of the first elastomer-modified olefin based resin and a content rate of the second elastomer-modified olefin based resin is 50 mass % or more.

2. The sealant film for a packaging material of a power storage device as recited in claim 1,
   wherein in the second resin layer, the content rate of the second elastomer-modified olefin based resin is 1 mass % to 50 mass %.

3. The sealant film for a packaging material of a power storage device as recited in claim 1,
   wherein the elastomer in the elastomer-modified homopolypropylene and/or elastomer-modified random copolymer in the first and/or second elastomer-modified olefin is an ethylene-propylene rubber.

4. The sealant film for a packaging material of a power storage device as recited in claim 1,
   wherein the first resin layer contains an anti-blocking agent and a slip agent together with the random copolymer, and wherein the second resin layer contains a slip agent together with the first elastomer-modified olefin based resin and the second elastomer-modified olefin based resin.

5. The sealant film for a packaging material of a power storage device as recited in claim 1,
wherein the second elastomer-modified olefin based resin has two or more crystallization peaks in a DSC measurement graph.

6. The sealant film for a packaging material of a power storage device as recited in claim 1,
wherein the sealant film comprises only the first resin layer and the second resin layer laminated on one surface of the first resin layer.

7. The sealant film for a packaging material of a power storage device as recited in claim 1,
wherein the sealant film is a laminated body in which at least three layers are laminated, the at least three layers including the second resin layer, the first resin layer laminated on one of surfaces of the second resin layer, and a first resin layer laminated on the other of surfaces of the second resin layer.

8. A packaging material for a power storage device, comprising:
a base material layer as an outer layer;
an inner sealant layer made of the sealant film as recited in claim 1; and
a metal foil layer arranged between the base material layer and the inner sealant layer,
wherein in the inner sealant layer, the first resin layer is arranged on an innermost layer side.

9. A sealant film for a packaging material of a power storage device, comprising:
a laminated body of two or more layers including
a first resin layer containing 50 mass % or more of a random copolymer containing propylene and another copolymer component other than propylene as copolymer components,
a second resin layer formed by a composition containing a first elastomer-modified olefin based resin having a crystallization temperature of 105° C. or higher and a crystallization energy of 50 J/g or more, and a polymer component,
wherein the first elastomer-modified olefin based resin is made of elastomer-modified homopolypropylene and/or elastomer-modified random copolymer,
wherein the elastomer-modified random copolymer is an elastomer-modified product of a random copolymer containing propylene and another copolymer component other than propylene as copolymer components,
wherein in the second resin layer, a content rate of the first elastomer-modified olefin based resin is 50 mass % or more, and
wherein the polymer component is at least one kind of polymer components selected from the group consisting of a random copolymer containing propylene and another copolymer component other than propylene as copolymer components, homopolypropylene, olefin based elastomer and styrene based elastomer.

10. The sealant film for a packaging material of a power storage device as recited in claim 9,
wherein in the second resin layer, a content rate of the polymer component is 1 mass % or more and less than 50 mass %.

11. The sealant film for a packaging material of a power storage device as recited in claim 9,
wherein an elastomer in the elastomer-modified homopolypropylene is an ethylene-propylene rubber, and
wherein an elastomer in the elastomer-modified random copolymer is an ethylene-propylene rubber.

12. The sealant film for a packaging material of a power storage device as recited in claim 9,
wherein the first resin layer contains an anti-blocking agent and a slip agent, and
wherein the second resin layer further contains a slip agent.

13. The sealant film for a packaging material of a power storage device as recited in claim 9,
wherein the sealant film comprises only the first resin layer and the second resin layer laminated on one surface of the first resin layer.

14. The sealant film for a packaging material of a power storage device as recited in claim 9,
wherein the sealant film is a laminated body in which at least three layers are laminated, the at least three layers including the second resin layer, a first resin layer laminated on one of surfaces of the second resin layer, and a first resin layer laminated on the other of surfaces of the second resin layer.

15. A packaging material for a power storage device, comprising:
a base material layer as an outer layer;
an inner sealant layer made of the sealant film as recited in claim 9; and
a metal foil layer arranged between the base material layer and the inner sealant layer,
wherein in the inner sealant layer, the first resin layer is arranged on an innermost layer side.

16. A sealant film for a packaging material of a power storage device, comprising:
a laminated body of two or more layers,
wherein the laminated body includes
a first resin layer containing 50 mass % or more of a random copolymer containing propylene and another copolymer component other than propylene as copolymer components,
a second resin layer formed by a composition containing a first elastomer-modified olefin based resin having a crystallization temperature of 105° C. or higher and a crystallization energy of 50 J/g or more, a second elastomer-modified olefin based resin having a crystallization temperature of 85° C. or higher and a crystallization energy of 30 J/g or less, and a polymer component,
wherein the first elastomer-modified olefin based resin is made of elastomer-modified homopolypropylene and/or elastomer-modified random copolymer,
wherein the second elastomer-modified olefin based resin is made of elastomer-modified homopolypropylene and/or elastomer-modified random copolymer,
wherein the elastomer-modified random copolymer is an elastomer-modified product of a random copolymer containing propylene and another copolymer component other than propylene as copolymer components,
wherein in the second resin layer, a total value of a content rate of the first elastomer-modified olefin based resin and a content rate of the second elastomer-modified olefin based resin is 50 mass % or more, and
wherein the polymer component is at least one kind of polymer component selected from the group consisting of a random copolymer containing propylene and another copolymer component other than propylene as copolymer components, homopolypropylene, olefin based elastomer and styrene based elastomer.

17. The sealant film for a packaging material of a power storage device as recited in claim 16,
wherein in the second resin layer, a content rate of the second elastomer-modified olefin based resin is 1 mass % to 50 mass %.

18. The sealant film for a packaging material of a power storage device as recited in claim 16,
wherein the second elastomer-modified olefin based resin has two or more crystallization peaks in a DSC measurement graph.

* * * * *